(12) United States Patent
Harada et al.

(10) Patent No.: US 10,462,355 B2
(45) Date of Patent: Oct. 29, 2019

(54) IMAGE PROCESSING APPARATUS TO GENERATE COMBINED IMAGES

(71) Applicant: CANON KABUSHIKI KAISHA, Tokyo (JP)

(72) Inventors: Sayaka Harada, Saitama (JP); Yosuke Takagi, Yokohama (JP); Rui Nabeshima, Yokohama (JP); Seiji Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/937,338

(22) Filed: Mar. 27, 2018

(65) Prior Publication Data
US 2018/0220063 A1  Aug. 2, 2018

Related U.S. Application Data

(62) Division of application No. 15/285,370, filed on Oct. 4, 2016, now Pat. No. 10,257,409.

(30) Foreign Application Priority Data

Oct. 6, 2015  (JP) .................................. 2015-198831
Oct. 6, 2015  (JP) .................................. 2015-198832
(Continued)

(51) Int. Cl.
*H04N 5/232*  (2006.01)
*G06F 3/0481*  (2013.01)
(Continued)

(52) U.S. Cl.
CPC ....... *H04N 5/23216* (2013.01); *G06F 3/0481* (2013.01); *G06F 3/0482* (2013.01);
(Continued)

(58) Field of Classification Search
CPC .......... H04N 5/23216; H04N 5/23293; H04N 5/23212; G11B 27/00; G06F 3/04817;
(Continued)

(56) References Cited

U.S. PATENT DOCUMENTS

2005/0157183 A1    7/2005  Iijima
2012/0017152 A1*   1/2012  Matsuda ................ G11B 27/34
                                                   715/723

FOREIGN PATENT DOCUMENTS

CN    104519218 A    4/2015
JP    2007336106 A   12/2007
(Continued)

OTHER PUBLICATIONS

Mouse Potato Designs, "i Movie Quick Tut: How to cut out (remove) a section of a video", posted dated Jul. 20, 2013, https://www.youtube.com/watch?v=fXJAOvsHMAM (Year: 2013).*
(Continued)

*Primary Examiner* — Lin Ye
*Assistant Examiner* — Chan T Nguyen
(74) *Attorney, Agent, or Firm* — Canon U.S.A., Inc. IP Division

(57) ABSTRACT

An image processing apparatus includes a selection unit that selects any of a plurality of items arranged in a first area, a switching unit that switches a mode between a at least first mode, in which an item displayed in the first area selectable, and a second mode, in which the image processing apparatus accepts an operation for an item line including a plurality of items arranged in a second area, and a control unit that performs control to display the item line so that a boundary area between two items included in the item line is not at a predetermined position in the second area in the second
(Continued)

mode, and display the item line so that the boundary area is at the predetermined position based on switching to the first mode.

16 Claims, 20 Drawing Sheets

(30) Foreign Application Priority Data

Oct. 6, 2015 (JP) ................................. 2015-198833
Oct. 6, 2015 (JP) ................................. 2015-198834

(51) Int. Cl.
    *G06F 3/0482* (2013.01)
    *G06F 3/0485* (2013.01)
    *G06F 3/0488* (2013.01)
    *G11B 27/00* (2006.01)
    *G11B 27/036* (2006.01)
    *G11B 27/34* (2006.01)

(52) U.S. Cl.
    CPC ........ *G06F 3/0485* (2013.01); *G06F 3/04817* (2013.01); *G06F 3/04883* (2013.01); *G11B 27/00* (2013.01); *G11B 27/036* (2013.01); *G11B 27/34* (2013.01); *H04N 5/23212* (2013.01); *H04N 5/23293* (2013.01)

(58) Field of Classification Search
    CPC .... G06F 3/0482; G06F 3/0485; G06F 3/0481; G06F 3/04883
    USPC ..................................................... 348/333.02
    See application file for complete search history.

(56) References Cited

FOREIGN PATENT DOCUMENTS

| | | |
|---|---|---|
| JP | 2011-040002 A | 2/2011 |
| JP | 2011-118604 A | 6/2011 |
| JP | 2013-506928 A | 2/2013 |
| JP | 2014112412 A | 6/2014 |
| JP | 2015035087 A | 2/2015 |
| WO | 2013/111239 A1 | 8/2013 |

OTHER PUBLICATIONS

Kanpani, D. "Premiere digital video studio: For Windows & Macintosh," Sep. 20, 2001, pp. 1, 87-88, and 356. Publisher: Shoeisha Co., Ltd., Tokyo, Japan. ISBN: 9784798100777.

* cited by examiner

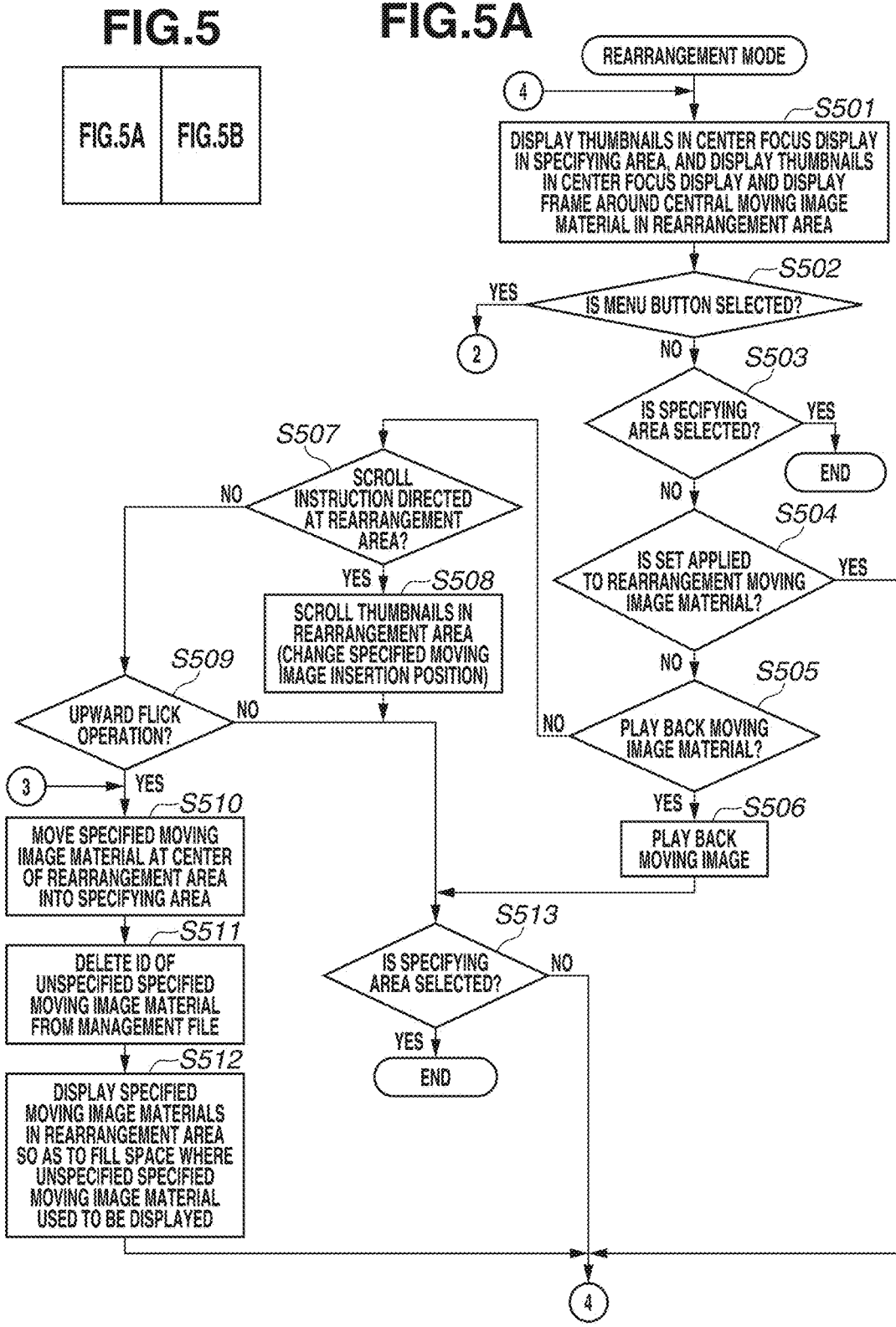

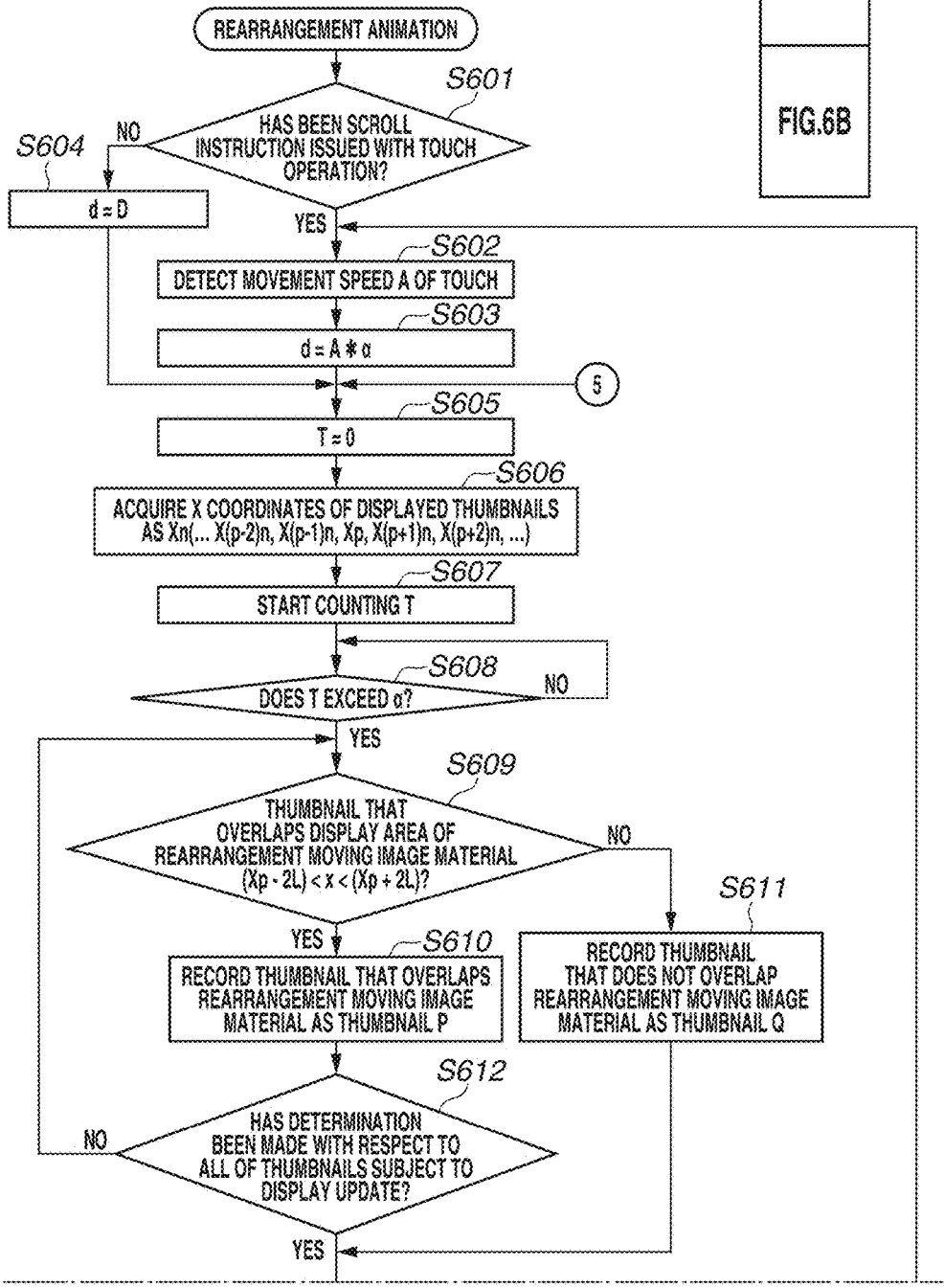

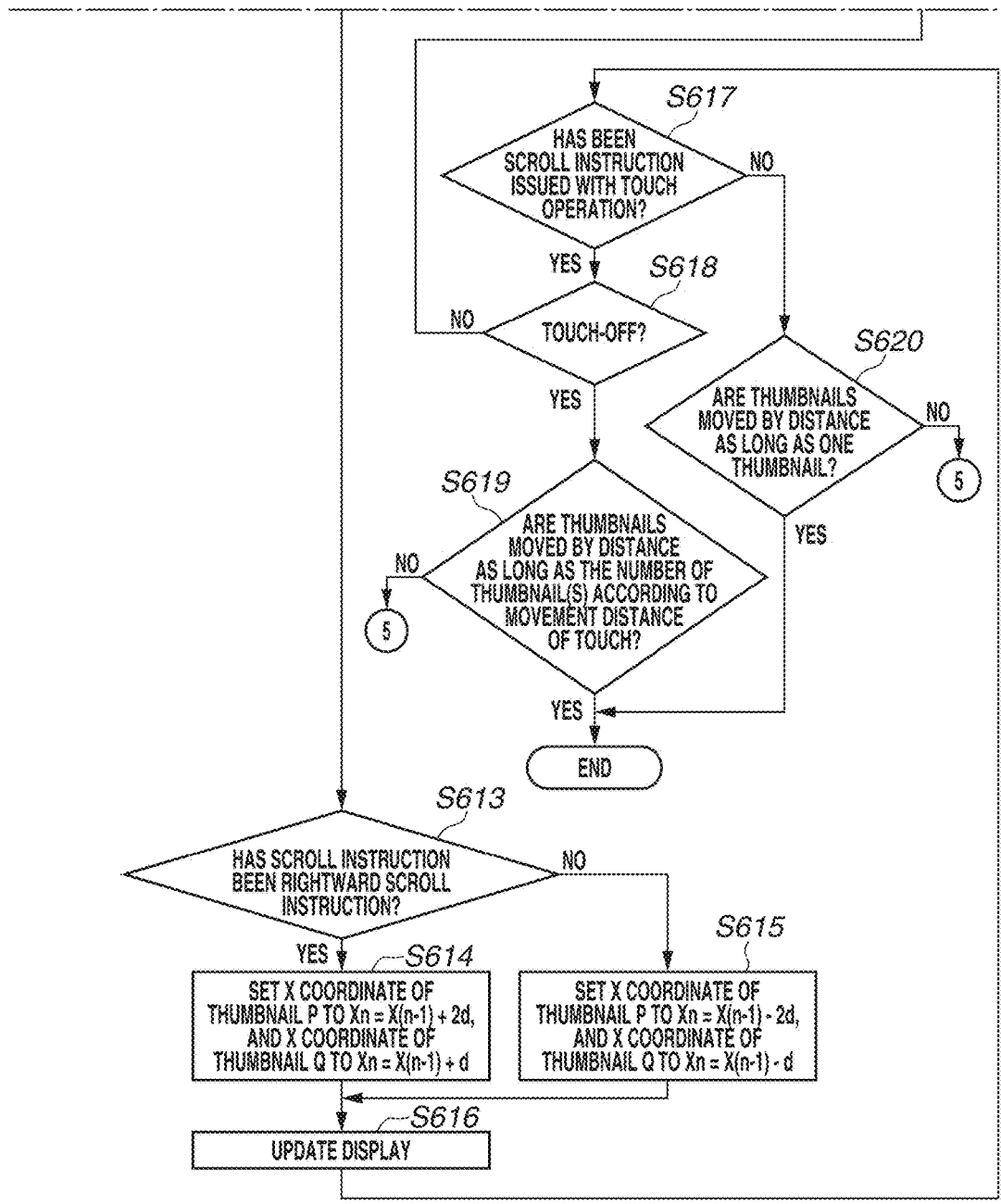

FIG.14A

| MANAGEMENT FILE OF SHORT CLIP MOVING IMAGE ||
|---|---|
| PLAYBACK ORDER | ID |
| 1 | 0003 |
| 2 | 0001 |
| 3 | |
| 4 | |
| 5 | |
| 6 | |
| 7 | |
| ... | |

FIG.14B

| MANAGEMENT FILE OF SHORT CLIP MOVING IMAGE ||
|---|---|
| PLAYBACK ORDER | ID |
| 1 | 0003 |
| 2 | 0006 |
| 3 | 0001 |
| 4 | |
| 5 | |
| 6 | |
| 7 | |
| ... | |

FIG.14C

| MANAGEMENT FILE OF SHORT CLIP MOVING IMAGE ||
|---|---|
| PLAYBACK ORDER | ID |
| 1 | 0003 |
| 2 | 0006 |
| 3 | 0007 |
| 4 | 0008 |
| 5 | |
| 6 | |
| 7 | |
| ... | |

FIG.14D

| MANAGEMENT FILE OF SHORT CLIP MOVING IMAGE ||
|---|---|
| PLAYBACK ORDER | ID |
| 1 | 0003 |
| 2 | 0007 |
| 3 | 0008 |
| 4 | |
| 5 | |
| 6 | |
| 7 | |
| ... | |

FIG.14E

| MANAGEMENT FILE OF SHORT CLIP MOVING IMAGE ||
|---|---|
| PLAYBACK ORDER | ID |
| m | 0005 |
| m + 1 | 0003 |
| m + 2 | 0006 |
| m + 3 | 0007 |
| m + 4 | 0008 |
| m + 5 | 0010 |
| m + 6 | ... |
| ... | ... |

FIG.14F

| MANAGEMENT FILE OF SHORT CLIP MOVING IMAGE ||
|---|---|
| PLAYBACK ORDER | ID |
| m | 0005 |
| m + 1 | 0003 |
| m + 2 | 0007 |
| m + 3 | 0006 |
| m + 4 | 0008 |
| m + 5 | 0010 |
| m + 6 | ... |
| ... | ... |

IMAGE PROCESSING APPARATUS TO GENERATE COMBINED IMAGES

CROSS REFERENCE TO RELATED APPLICATIONS

The present application is a Divisional of U.S. patent application Ser. No. 15/285,370, filed on Oct. 4, 2016, which claims priority from Japanese Patent Application No. 2015-198831, filed Oct. 6, 2015, No. 2015-198832, filed Oct. 6, 2015, No. 2015-198833, filed Oct. 6, 2015, and No. 2015-198834, filed Oct. 6, 2015, which are hereby incorporated by reference herein in their entirety.

BACKGROUND

Field

Aspects of the present invention generally relate to a technique when an image or an item is displayed.

Description of the Related Art

When editing a moving image, a slide show, etc., a user combines a plurality of material images and/or material moving images to generate a user's unique combined moving image or the like. When generating such a combined moving image, the user generates one combined moving image by specifying a desired material that the user wants to contain in the combined moving image from a plurality of material images and/or material moving images. Japanese Patent Application Laid-Open No. 2005-86218 discusses that, when moving images from among a plurality of moving images are combined with one another, a moving image picked by a mouse click is combined to a moving image located at a destination to which the moving image picked by the mouse click is moved with a drag operation. In Japanese Patent Application Laid-Open No. 2005-86218, the moving image picked by the mouse click is combined with the moving image located at the destination to which the moving image picked by the mouse click is moved so as to be in a position subsequent to the moving image located at the destination.

When generating a combined moving image, the user can find a position where the user wants to insert some materials in an already existing combined moving image before deciding materials to insert. For example, when the user attempts to make a combined moving image interesting by inserting a material having a different tone at a position where materials of similar scenery moving images are consecutively lined up in the combined moving image, in the method discussed in Japanese Patent Application Laid-Open No. 2005-86218, the user first selects moving images to be combined with one another even though the user has already decided a position to insert a moving image. More specifically, in the method discussed in Japanese Patent Application Laid-Open No. 2005-86218, the user cannot specify a position to insert a moving image until selecting moving images to be combined with one another, and therefore should again search for the position where the user has decided to insert the material and drag the selected material to the rediscovered position after selecting the material having a different tone. In this manner, even when the user finds a position where the user wants to insert some kind of material, the user cannot specify the position as a position to insert a material unless first selecting materials. The operational usability is therefore impaired. Further, in the method discussed in Japanese Patent Application Laid-Open No. 2005-86218, when already having in mind a position where the user wants to insert an item, such as a material, the user should remember materials between which the user has decided to insert the item while selecting the material to insert at the position.

The user can rearrange a plurality of items arranged in a row so as to line up them in an order desired by the user. Japanese Patent Application Laid-Open No. 2009-266192 discusses that an icon in an icon row that is desired to be reordered is extracted from the icon row, and a position where the extracted icon is inserted is changed by a scroll of the icon row from which the extracted icon has been removed. Further, Japanese Patent Application Laid-Open No. 2015-88159 discusses that, when a swipe operation is performed starting from an image to be interchanged as a starting position among the images displayed in a manner arranged in one row, a display position of this image is interchanged with a display position of an image located at a position where the swipe operation is ended.

There is a demand for performing such an editing operation that an item, such as an image and an icon, is rearranged in the order desired by the user with use of a limited display area. With the method discussed in Japanese Patent Application Laid-Open No. 2009-266192, the user performs an operation for extracting an icon to reorder from the row, and changing an insertion position of the extracted icon. Therefore, this method requires provision of an area where the extracted icon is displayed separately from an area where the icon row is displayed. However, a display screen including a limited available display area may not be large enough to fully display the extracted icon in the display area. With the method discussed in Japanese Patent Application Laid-Open No. 2015-88159, it becomes difficult to recognize images in an image row between which an image to be interchanged will be inserted, i.e., it becomes difficult for the user to recognize a position where the image to be interchanged will be inserted while performing the interchange operation. There is therefore a possibility that the operational usability is impaired.

A plurality of images can be combined with one another to form a series of images. A display unit discussed in Japanese Patent Application Laid-Open No. 10-98667 displays an area where thumbnails corresponding to moving images are displayed in a list, and a selected scenario display field where thumbnails of moving images to be played back as a scenario file are displayed. Japanese Patent Application Laid-Open No. 10-98667 also discusses that dragging a thumbnail from the list of thumbnails to the selected scenario display field causes the dragged thumbnail to be added to the selected scenario display field, and a symbol to be added to the already-selected thumbnail in the list of thumbnails. Japanese Patent Application Laid-Open No. 10-98667 also discusses that dragging a thumbnail displayed in the selected scenario display field out of the selected scenario display field enables the thumbnail to be removed from the selected scenario display field.

The user can find an image that the user wants to remove from among listed images in an image list in the middle of an operation for selecting images. With the method discussed in Japanese Patent Application Laid-Open No. 10-98667, even when finding a thumbnail that the user wants to remove in a list of thumbnails, the user should search for this thumbnail in the selected scenario display field to remove that. In other words, the user not only has to additionally perform an operation for searching for the image from the area where the selected images are displayed but also cannot remove the unnecessary image quickly in the middle of the selection operation. The operational usability for the user is therefore impaired.

There is known a technique for rearranging a plurality of items arranged in a row so as to line up them in the order desired by the user with a touch operation. Japanese Patent Application Laid-Open No. 2015-88159 discusses that, when a swipe operation is performed starting from an image to be interchanged as the starting position among the images displayed in the manner arranged in one row, a display position of an image located at a position where the swipe operation is ended is interchanged with a display position of the image to be interchanged. There is also known a technique for, when an operation target is operated with a touch operation, displaying the operation target, such as an icon, at a position slightly shifted from a touched position so as to prevent the operation target from being hidden by a finger performing the touch operation. Japanese Patent Application Laid-Open No. 2013-93043 discusses that an item displayed in a touched area is displayed at a position slightly shifted from the touched point.

On an apparatus equipped with only a small display, such as a compact electronic apparatus, even when rearranging a plurality of items, the user should rearrange them within the limited display area. With the method discussed in Japanese Patent Application Laid-Open No. 2015-88159, when an image to be interchanged in terms of the arrangement order is moved by a swipe operation, image visibility is reduced if an image arranged in one row and the image to be interchanged overlap each other. If an image to be interchanged is displayed at a position different from a touched position so as to be prevented from overlapping with other image, like the display method discussed in Japanese Patent Application Laid-Open No. 2013-93043, the image to be interchanged may not be fully displayed because of the limited display area.

SUMMARY

Aspects of the present invention are generally directed to, in consideration of the above-described issues, providing an image processing apparatus that enables, when a plurality of materials is combined with one another for generation of a series of images, a user to insert a specified material at an insertion position selected before specifying the material. Aspects of the present invention are also directed to providing an image processing apparatus that enables, while a user is a selecting material, the user to intuitively recognize materials between which the material to be selected will be inserted.

Aspects of the present invention are directed to, in consideration of the above-described issues, providing an electronic apparatus that enables a user to change an arrangement order of a plurality of items within a limited display area with improved operational usability.

Aspects of the present invention are directed to, in consideration of the above-described issues, providing a display processing apparatus that enables, when a plurality of images are combined with one another for generation of a series of images, a user to specify and remove an image with improved operational usability.

Aspects of the present invention are directed to, in consideration of the above-described issues, providing an electronic apparatus that prevents reduction in visibility of an item to be rearranged in a limited display area.

According to an aspect of the present invention, an image processing apparatus includes a selection unit configured to select any of a plurality of items arranged along a first direction in a first area of a display unit, a switching unit configured to switch a mode between at least a first mode, in which an item displayed in the first area is selectable, and a second mode, in which the image processing apparatus accepts an operation for an item line including a plurality of items arranged along the first direction in a second area of the display unit, and a control unit configured to perform control so as to display the item line in a manner that a boundary area between two items included in the item line is not located at a predetermined position in the second area in the second mode, and to display the item line in a manner that the boundary area is located at the predetermined position based on switching to the first mode.

Further features of aspects of the present invention will become apparent from the following description of exemplary embodiments with reference to the attached drawings.

BRIEF DESCRIPTION OF THE DRAWINGS

FIG. 5 is a diagram including the flowcharts of FIGS. 5A and 5B. FIGS. 5A and 5B are flowcharts illustrating processing in a rearrangement mode.

FIG. 6 is a diagram including the flowcharts of FIGS. 6A and 6B. FIGS. 6A and 6B are flowcharts illustrating processing regarding a rearrangement animation.

FIGS. 14A to 14F are tables each illustrating a recording state of a management file.

DESCRIPTION OF THE EMBODIMENTS

In the following description, representative exemplary embodiments of the present invention will be described with reference to the drawings.

The following exemplary embodiment is merely one example for implementing aspects of the present invention and can be appropriately modified or changed depending on individual constructions and various conditions of apparatuses to which the aspects of the present invention are applied. Thus, the aspects of the present invention are in no way limited to the following exemplary embodiment.

Figure 1:
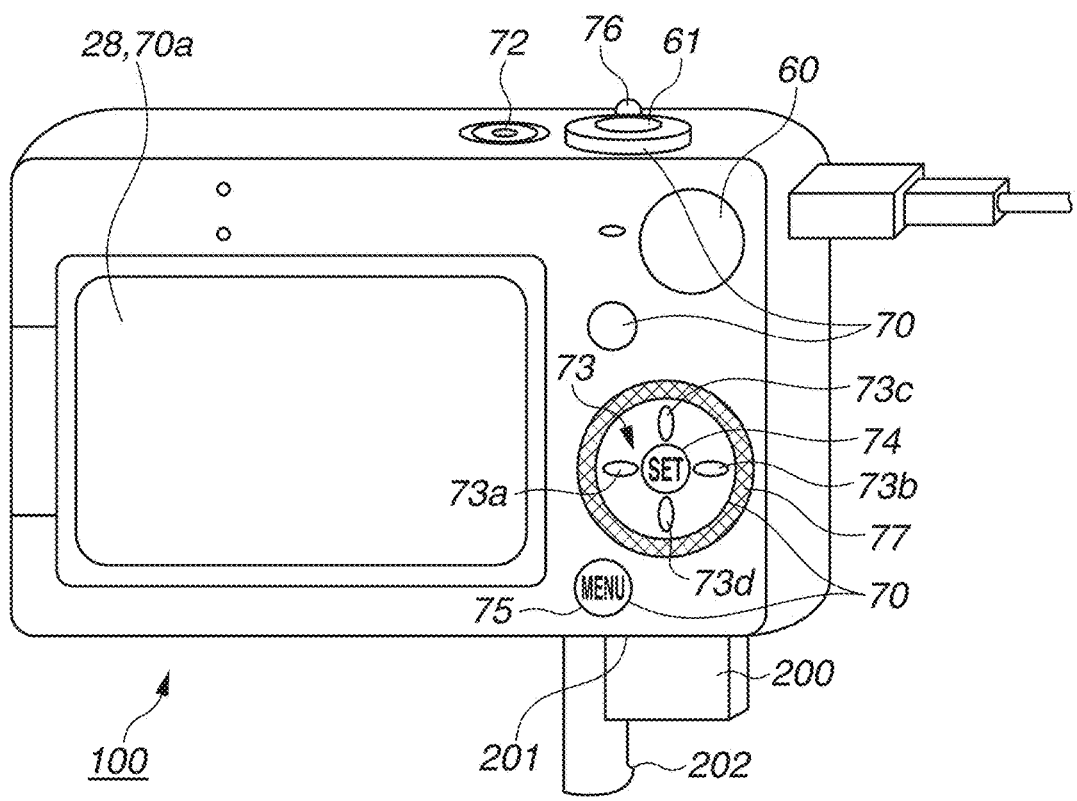
FIG. 1 illustrates an external view of a digital camera as an example of an apparatus to which a configuration according to an exemplary embodiment of the present invention is applicable.

FIG. 1 illustrates an external view of a digital camera 100 as an example of an electronic apparatus according to the aspects of the present invention. A display unit 28 is a display unit where an image and various kinds of information are displayed. A touch panel 70a that receives a touch operation (detecting a touch) is laid on the display unit 28. A shutter button 61 is an operation unit for issuing an image capturing instruction. A mode selection switch 60 is an operation unit for switching various kinds of modes. An operation unit 70 is an operation unit including an operation member, such as various kinds of switches, a button, and a touch panel, that receive various kinds of operations from a user.

A four-way operational key 73 is an operation member equipped with up, down, left, and right keys and included in the operation unit 70, and enables the user to perform an operation in a direction according to a direction of each of the keys. When a left key 73a, a right key 73b, an up key 73c, and a down key 73d are pressed, a selected item, a cursor, a display position of the image, or the like are changed in the respective directions. For example, when the right key 73b is pressed, the selected item is switched to an item located to the right of the currently selected item.

A SET button 74 is a button for setting the selected item. A menu button 75 functions as a button for displaying a menu screen when a playback screen or an image capturing screen is displayed, as a return button when a screen where the item is set is displayed, and as a button for transitioning (and returning) to a screen for confirming an edited image when a screen where an editing operation is in progress is displayed. A scaling ratio switching bar 76 is a bar that enables the user to change a scaling ratio of a playback image when the playback image is displayed by operating the scaling ratio switching bar 76 so as to rotate it to the left or the right, and the user can reduce the image by rotating the scaling ratio switching bar 76 to the left and enlarge the image by rotating the scaling ratio switching bar 76 to the right.

A dial 77 is a rotational member that enables the user to perform a scroll operation, such as moving the selected item and switching the displayed item by rotationally operating the dial 77. A power switch 72 is a pressing button for switching power-on and power-off. A recording medium 200 is a nonvolatile recoding medium, such as a memory card and a hard disk. A recording medium slot 201 is a slot for storing the recording medium 200. Storing the recording medium 200 into the recording medium slot 201 enables the recording medium 200 to communicate with the digital camera 100 and record and playback images therein.

A cover 202 is a cover of the recording medium slot 201. FIG. 1 illustrates the digital camera 100 with the cover 202 opened and the recording medium 200 partially extracted and exposed from the slot 201.

The digital camera 100 includes the touch panel 70a that can detect the touch on the display unit 28 as one component of the operation unit 70. The touch panel 70a and the display unit 28 can be configured integrally with each other. For example, the touch panel 70a is configured in such a manner that an optical transmission ratio thereof does not disturb the display on the display unit 28, and is mounted on an upper layer of a display surface of the display unit 28. Then, an input coordinate on the touch panel 70a and a display coordinate on the display unit 28 are associated with each other. This configuration can construct a graphical user interface (GUI) that appears as if the user can directly operate a screen displayed on the display unit 28. A system control unit 50 can detect the following operations on or states of the touch panel 70a:

A finger or a pen that has not been touching the touch panel 70a touches the touch panel 70a. In other words, the touch is started (hereinafter referred to as a Touch-Down).

The touch panel 70a is in a state touched by a finger or a pen (hereinafter referred to as a Touch-On).

A finger or a pen is moved while maintaining contact (touch) with the touch panel 70a (hereinafter referred to as a Touch-Move).

A finger or a pen that has been touching the touch panel 70a is separated from the touch panel 70a. In other words, the touch is ended (hereinafter referred to as a Touch-Up).

The touch-panel 70a is in a state where it is not being touched (hereinafter referred to as a Touch-Off).

When the Touch-Down is detected, a start of the Touch-On is also detected at the same time. After the Touch-Down, the detection of the Touch-On normally continues unless the Touch-Up is detected. When the Touch-Move is detected, the Touch-On is also detected. When the Touch-On is detected, the Touch-Move is not detected unless the touched position is being moved. After detection of the Touch-Up of any and all fingers or pens that are touching the touch panel 70a, the touch panel 70a transitions to the Touch-Off. A term "tap" is used to refer to a series of operations of performing the Touch-Up without the Touch-Move immediately after the Touch-On. The system control unit 50 is notified of these operations/states and a coordinate of a position touched by the finger or the pen on the touch panel 70a via an internal bus, and determines what kind of operation is performed on the touch panel 70a based on the information that the system control unit 50 is provided. Regarding the Touch-Move, the system control unit 50 can also determine a movement direction of the finger or the pen being moved on the touch panel 70a based on a change in the coordinate of the position for each of a vertical component and a horizontal component on the touch panel 70a. Further, it is defined that a stroke is drawn when the Touch-Up is performed from the Touch-Down via the Touch-Move performed in a predetermined manner on the touch panel 70a. An operation of quickly drawing the stroke is referred to as a flick. The flick is an operation of rapidly moving the finger only by a certain distance while the finger keeps in contact (touch) with the touch panel 70a, and separating the finger from the touch panel 70a directly therefrom. In other words, the flick is an operation of rapidly sliding the finger on the touch panel 70a as if the finger flicks on the touch panel 70a. The system control unit 50 can determine that the flick is performed when detecting that the Touch-Move is performed for greater than or equal to a predetermined distance at a speed greater than or equal to a predetermined speed and detecting the Touch-Up directly therefrom. When the flick operation is valid on a thumbnail row (an item row) displayed in a specifying area or a rearrangement area, which will be described below, the execution of the flick operation to the left or the right causes the thumbnail row to be scrolled while the scrolling is slowing down even after the Touch-Up, and then stops thereafter. In other words, the issue of a scroll instruction with the flick operation enables the user to scroll the thumbnail row by a longer distance than an amount of the Touch-Move, and thereby to search for an image quickly with fewer operations. The scroll operation is an operation of performing the Touch-Move by a longer distance than the flick operation, and, inputs, for example, an instruction to move a touched target according to the operation distance. The flick operation, which performs the Touch-Move by a shorter distance than the scroll operation, inputs an instruction to move the touched target by a distance that increases as a movement speed of the finger in the flick operation increases (an amount of the instruction increases according to the speed). The system control unit 50 determines that a drag is performed when detecting that the Touch-Move is performed for greater than or equal to a predetermined distance at a speed less than a predetermined speed. The touch panel 70a can be embodied by employing any type of touch panel from among various types of touch panels, such as a resistive film touch panel, a capacitive touch panel, a surface acoustic wave touch panel, an infrared touch panel, an electromagnetic induction touch panel, a touch panel based on image recognition, a touch panel based on an optical sensor, etc. Employable detection methods include a method that detects that the touch is input when the touch panel 70a is touched and a method that detects that the touch is input even when a finger or a pen is in proximity to the touch panel 70a without actually touching the touch panel 70a. Depending on the specific type of the touch panel 70a, the touch panel 70a can implement one or more of the these methods.

Figure 2:
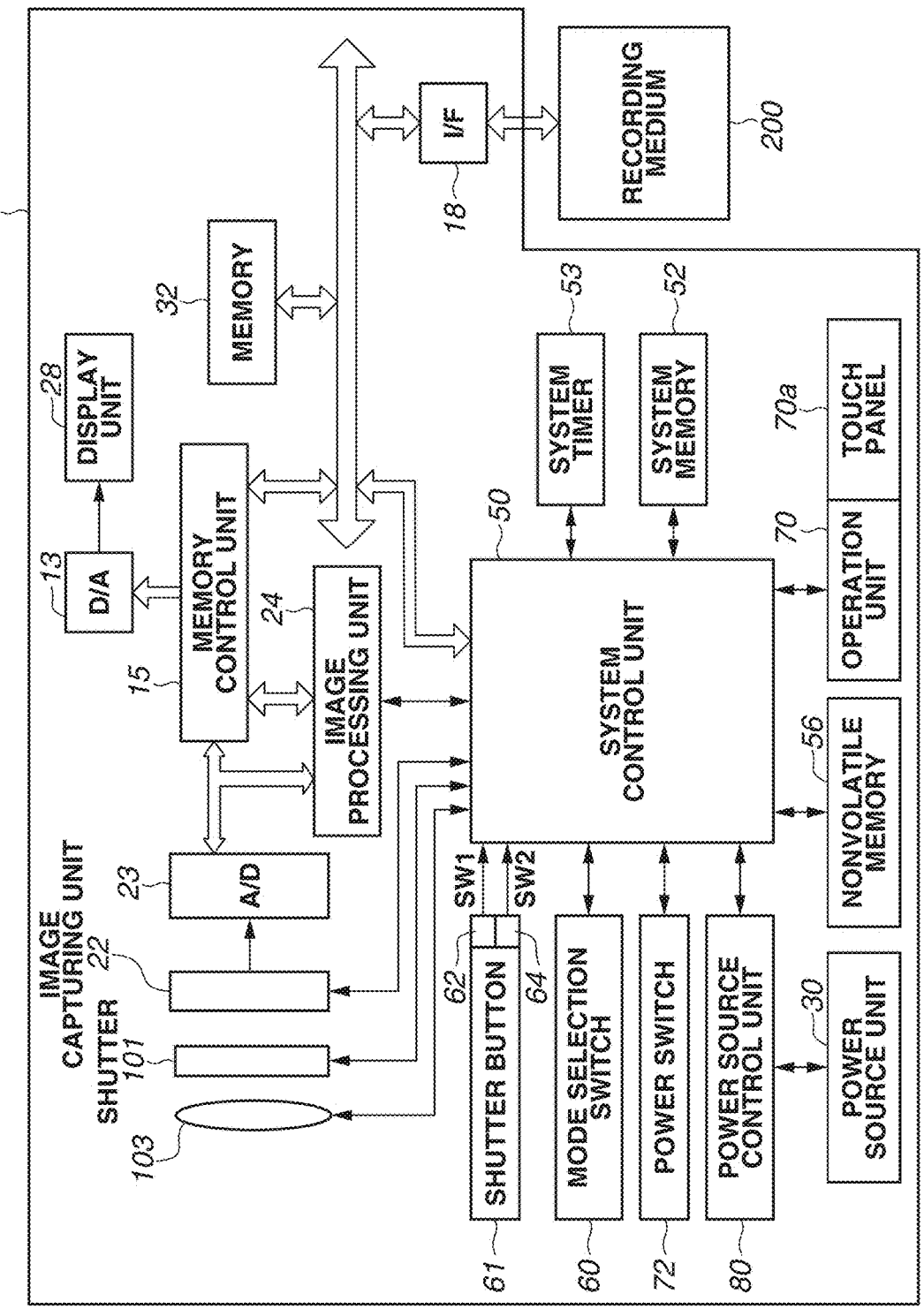
FIG. 2 is a block diagram illustrating an example of a configuration of the digital camera as an example of the apparatus to which the configuration according to the present exemplary embodiment is applicable.

FIG. 2 is a block diagram illustrating an example of a configuration of the digital camera 100 according to the present exemplary embodiment.

In FIG. 2, an image capturing lens 103 is a lens group including a zoom lens and a focus lens. A shutter 101 is a shutter including a diaphragm function. An image capturing unit 22 is an image sensor constructed with use of, for example, a charge-coupled device (CCD) sensor or a complementary metal-oxide semiconductor (CMOS) sensor that converts an optical image into an electric signal. An analog-to-digital (A/D) converter 23 converts an analog signal into a digital signal. The A/D converter 23 is used to convert an analog signal output from the image capturing unit 22 into a digital signal.

An image processing unit 24 performs predetermined pixel interpolation, resizing processing such as a reduction, and color conversion processing on data output from the A/D converter 23 or data output from a memory control unit 15. The image processing unit 24 also performs predetermined calculation processing using captured image data. A system control unit 50 controls an exposure and ranging based on an acquired result of the calculation. Based on this control, the digital camera 100 performs automatic focus (AF) processing, automatic exposure (AE) processing, and electro focus (EF) (flash preliminary emission) processing of the Through-The-Lens (TTL) method. The image processing unit 24 also performs predetermined calculation processing using the captured image data. The digital camera 100 also performs automatic white balance (AWB) processing of the TTL method based on an acquired result of the calculation.

The output data from the A/D convertor 23 is written into a memory 32 via the image processing unit 24 and the memory control unit 15, or is directly written into the memory 32 via the memory control unit 15. The memory 32 stores image data acquired by the image capturing unit 22 and converted into the digital data by the A/D converter 23, and image data to be displayed on the display unit 28. The memory 32 includes a storage capacity sufficient to store a predetermined number of still images or a moving image and audio data lasting for a predetermined time period.

The memory 32 also serves as a memory for an image display (a video memory). A digital-to-analog (D/A) converter 13 converts data for the image display that is stored in the memory 32 into an analog signal, and supplies the converted data to the display unit 28. In this manner, the image data for the display written in the memory 32 is displayed by the display unit 28 via the D/A converter 13. The display unit 28 presents a display according to the analog signal supplied from the D/A converter 13 on a display device, such as a liquid crystal display (LCD). The digital camera 100 can function as an electronic viewfinder and realize a through-the-lens image display (a live view display) by converting, into the analog signal by the D/A converter 13, the digital signal first converted from the analog signal by the A/D converter 23 and then stored into the memory 23, and sequentially transferring this digital signal to the display unit 28 to display it thereon.

A nonvolatile memory 56 is a memory as an electrically erasable and recordable recording medium, and, for example, an electrically erasable programmable read only memory (EEPROM) is used as the nonvolatile memory 56. The nonvolatile memory 56 stores a constant, a program, and the like for an operation of the system control unit 50. The program described here refers to a computer program for performing various processing procedures associated with flowcharts of the present exemplary embodiment that will be described below.

The system control unit 50 controls the entire digital camera 100. The system control unit 50 realizes each processing procedure according to the present exemplary embodiment described below by executing the above-described program recorded in the nonvolatile memory 56. Further, the system control unit 50 also performs display control by controlling the memory 32, the D/A converter 13, the display unit 28, etc.

A random access memory (RAM) is used as a system memory 52. Constants, variables, programs read out from the non-volatile memory 56, and so forth, for operation of the system controller 50, are loaded to system memory 52, for which random access memory (RAM) or the like is used.

A system timer 53 is a timer that measures a time period, and can measure, for example, a time period for updating a display in an animation.

The mode selection switch 60, the shutter button 61, and the operation unit 70 are operation units for inputting various kinds of operation instructions to the system control unit 50. The mode selection switch 60 switches an operation mode of the system control unit 50 to any of a still image recording mode, a moving image capturing mode, a short clip mix, a playback mode, etc. The user can directly switch the operation mode to any of these modes contained in the menu screen using the mode selection switch 60. Alternatively, the user can switch the operation mode to any of these modes contained in the menu screen using another operation member after first switching the screen to the menu screen using the menu button 75. The captured image is recorded in the recording medium 200, and can be played back in the playback mode.

A first shutter switch 62 is switched "on" to generate a first shutter switch signal SW1 halfway through an operation of the shutter button 61 provided on the digital camera 100, i.e., upon the shutter button 61 being depressed half-way ("half-press") (an instruction to prepare to capture the image). The first shutter switch signal SW1 triggers a start of an operation, such as the AF processing, the AE processing, the AWB processing, and the EF (flash preliminary emission) processing. A second shutter switch 64 is switched "on" to generate a second shutter switch signal SW2 upon completion of the operation of the shutter button 61, i.e., upon the shutter button 61 being fully depressed ("full-press") (an instruction to capture the image). The second shutter switch signal SW2 causes the system control unit 50 to start a series of image capturing processing operations from reading out a signal from the image capturing unit 22 to writing image data into the recording medium 200.

The operation unit 70 includes at least the dial 77, the four-way operational key 73, the SET button 74, the touch panel 70a, and the menu button 75.

A power source control unit 80 includes a battery detection circuit, a direct-current-to-direct-current (DC-DC) converter, a switch circuit that switches a block to which power is supplied, etc. The power source control unit 80 detects whether a battery is mounted, a battery type, and a remaining battery level. The power source control unit 80 controls the DC-DC converter based on a result of the detection and an instruction from the system control unit 50, and supplies a required voltage to each of the units, including the recording medium 200, for a required time period. The power switch 72 requests the system control unit 50 to power on and off the digital camera 100 according to a user's operation of switching on and off the power switch 72.

A power source unit 30 includes a primary battery, such as an alkaline battery or a lithium battery, a secondary battery, such as a nickel-cadmium (NiCd) battery, a nickel metal hydride (NiMH) battery, or a lithium (Li) battery, an alternating-current (AC) adapter, etc. A recording medium interface (I/F) 18 is an interface with the recording medium 200, such as a memory card or a hard disk. The recording medium 200 is a nonvolatile recording medium for recording the captured image, such as a memory card, and is constructed using a semiconductor memory, an optical disk, a magnetic disk, etc.

A short clip mix moving image, which will be described in the present exemplary embodiment, is a moving image lasting for two to five seconds that is captured in the short clip mix, which is one type of moving image capturing mode. An effect can be applied to the moving image to carry out slow playback, double speed playback, and repeat playback. An identification (ID) of the short clip mix moving image (an ID that makes this moving image distinguishable from a moving image captured in another mode) is assigned to the moving image captured in the short clip mix, and is recorded. The moving image can be edited and played back on a screen for editing the short clip mix, and a plurality of captured short clip mix moving images is connected (combined) to one another as moving image materials and is organized into a combined moving image on the editing screen so that one combined moving image set (a moving image file) is generated.

Figure 7A:
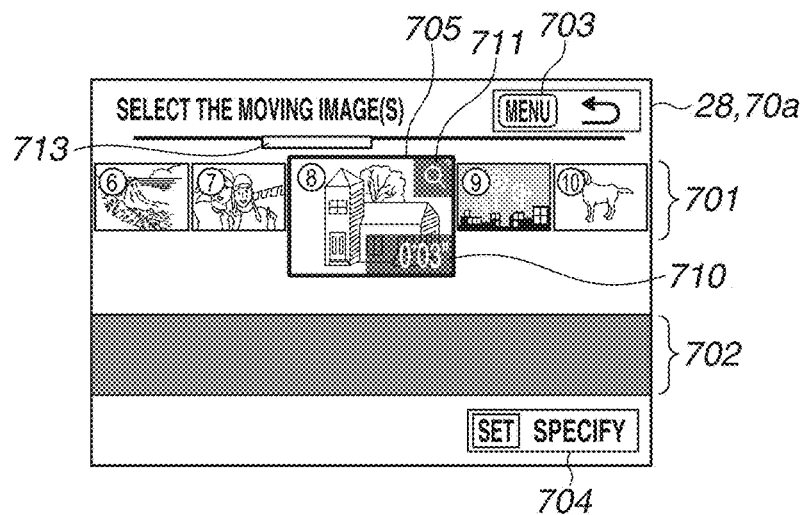
FIGS. 7A to 7F are diagrams each illustrating an example of a screen for editing a short clip mix.

The screen for editing the short clip mix, where the user performs an operation for editing the short clip mix, will be described below with reference to FIGS. 7A to 7F. FIGS. 7A to 7F illustrate an example of the screen for editing the short clip mix, and include a specifying area 701 where thumbnails (items) representing the moving images captured in the short clip mix (hereinafter referred to as the moving image materials) are arranged in a single row in a chronological order from left to right (the left moving image material is older). The chronological order refers to an order of filenames, an order of dates and/or times when the images are captured, an order of dates and/or times when files are generated, etc. The arrangement of the thumbnails in the chronological order makes it easy for the user to expect a position where a desired thumbnail is located, and to search for the desired thumbnail according to a rule of the arrangement order. The screen for editing the short clip mix also includes an area as a rearrangement area 702 where thumbnails of moving image materials specified by the user are arranged in a single row as the moving image materials to be contained in the combined moving image that is the short clip mix moving image. A number illustrated in a manner superimposed on each of the thumbnails is presented to indicate a number of the thumbnail, but is not actually displayed. A number of the moving image material corresponding to each of the thumbnails is the same as the number of the thumbnail, and, for example, the moving image material corresponding to a thumbnail 8 is a moving image material 8. The moving image materials corresponding to the thumbnails displayed in the rearrangement area 702 are combined with one another to generate a single combined moving image. In the combined moving image, the moving images corresponding to the thumbnails displayed in the order from left to right in the rearrangement area 702 are played back (sequential playback). In other words, the combined moving image is played back in the order in which the thumbnails are arranged. The IDs of the moving image materials displayed in the rearrangement area 702 are recorded in the management file in the recording medium 200, and the IDs of the moving image materials are recorded in the management file in correspondence with the order of being played back (the order of being combined). Alternatively, the digital camera 100 can be configured to add information indicating the playback order to each of the moving image materials. The number of moving image materials containable in the combined moving image is up to 40. An operation for rearranging a specified moving image material can be received in the rearrangement area 702. When the digital camera 100 is in the moving image specifying mode, a moving image material to be contained in the combined moving image can be specified as the specified moving image from among moving image materials 6 to 10 lined up in the specifying area 701, as illustrated in FIG. 7A. Further, the scroll operation can also cause a display of a thumbnail of a moving image other than the moving image materials 6 to 10. A frame 705 is displayed around a thumbnail located at a center among the displayed thumbnails. When a moving image material is specified, the thumbnail located at a position in the frame 705 (the center) (the thumbnail 8 in the example illustrated in FIG. 7A) is moved into the rearrangement area 702 (the moving image material corresponding to the moved thumbnail is set as the specified moving image). At this time, the moving image material 8 is contained into the combined moving image, and the ID of the moving image material 8 is recorded into the management file. When a plurality of moving image materials is moved into the rearrangement area 702, and, SET is applied to the thumbnail displayed in the rearrangement area 702 (the thumbnail displayed in the rearrangement area 702 is set), the user can perform a rearrangement operation with the scroll operation. In this manner, even when there are the moving image materials (the thumbnails) as many as a number that makes it impossible to display all of them on a small operation screen, like the digital camera 100, the user can switch the displayed (operable) moving image materials with the scroll operation. Therefore, the user can perform the operation, such as specifying the moving image material and rearranging the moving image material. The screen is divided into the specifying area 701 and the rearrangement area 702 to enable the user to perform the operation for specifying the moving image material and the operation for editing the moving image material on the same screen (without causing a screen transition), whereby the operation for editing the image can be performed by the user with improved operational usability. The plurality of thumbnails displayed in the specifying area 701, and the plurality of thumbnails displayed in the rearrangement area 702 are displayed in a manner arranged in parallel with each other. The five thumbnails are displayed in the specifying area 701 illustrated in FIGS. 7A to 7F, but the number of thumbnails displayable in the specifying area 701 can be three or seven.

Figure 3:
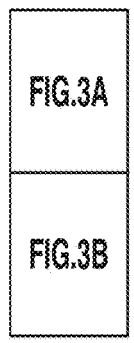
FIG. 3 is a diagram including the flowcharts of FIGS. 3A and 3B.
Figure 3A:
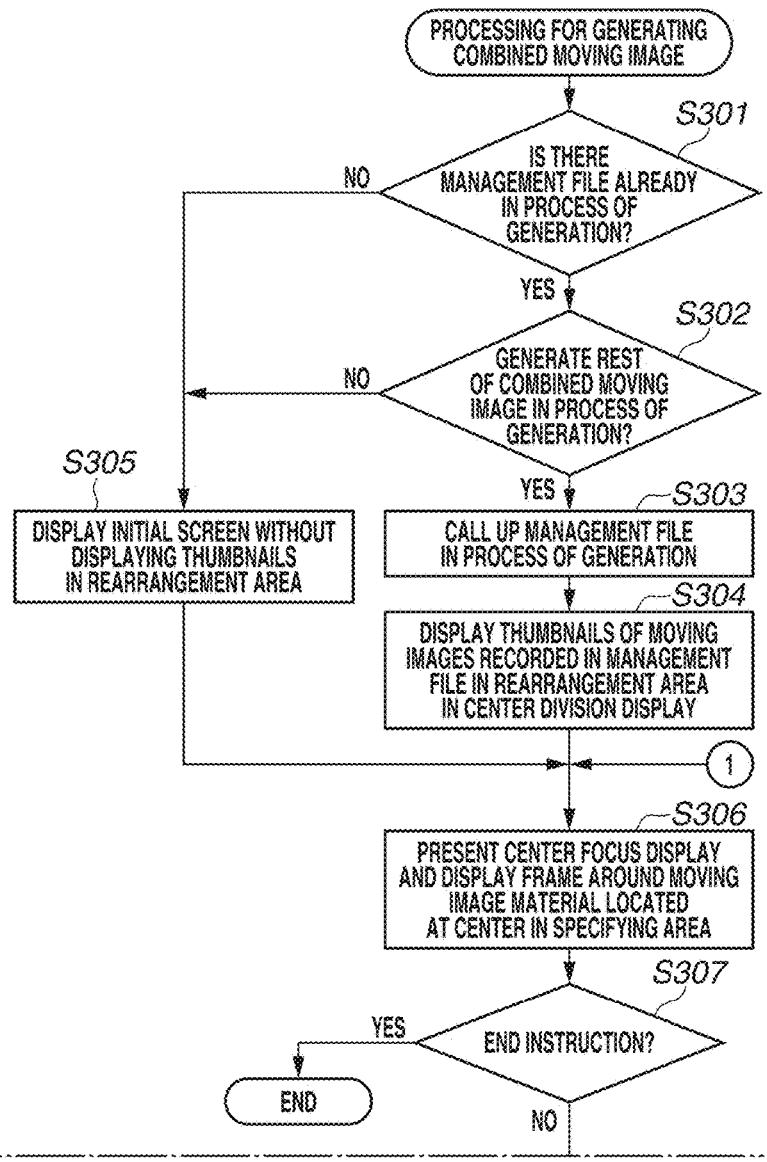
FIGS. 3A and 3B are flowcharts illustrating processing for generating a combined moving image.

The processing for generating the combined moving image according to the present exemplary embodiment will be described with reference to FIGS. 3A and 3B. The program recorded in the nonvolatile memory 56 is loaded to the system memory 52 and is executed by the system control unit 50, by which this processing is realized. The processing is started when the digital camera 100 is powered on, the playback mode is selected (the playback screen is displayed), and, the screen for editing the short clip mix is selected. The processing illustrated in FIGS. 3A and 3B indicates a mode in which the operation for specifying the moving image material is performed (the moving image specifying mode).

In step S301, the system control unit 50 determines whether the management file of a combined moving image in the process of generation is recorded in the recording medium 200. Regarding the short clip mix moving image, the management file of a combined moving image processed by the previous editing operation is stored regardless of whether moving image materials in this management file are combined (connected) to one another and stored as the combined moving image. If there is such a management file, the user can generate the combined moving image so as to resume the previous generation. If the system control unit 50 determines that there is already a management file in the process of generation (YES in step S301), the processing proceeds to step S302. If not (NO in step S301), the processing proceeds to step S305.

In step S302, the system control unit 50 determines whether to generate the rest of the combined moving image in the process of generation based on an instruction from the user (determines whether to overwrite the management file determined in step S301). If the system control unit 50 determines that there is the combined moving image in the process of generation in step S301 (YES in step S301), the digital camera 100 is configured to display options of whether to perform the editing operation so as to resume the previous generation or newly generate the combined moving image on the display unit 28, whereby the user can select any of them. If the system control unit 50 determines (is instructed) to generate the rest of the combined moving image in the process of generation (YES in step S302), the processing proceeds to step S304. If the system control unit 50 determines not to generate the rest of the combined moving image in the process of generation (NO in step S302), the processing proceeds to step S305.

In step S303, the system control unit 50 calls up (reads in) the management file in the process of generation. FIGS. 14A to 14F each illustrate an example of a recording state of the management file written in the recording medium 200, in which the playback order and the ID assigned to each one of the short clip moving images are written in correspondence with each other. In the present exemplary embodiment, these numbers will be described, assuming that the number of the moving image material and the number of the ID are set to correspond to each other, like 0001 set as the ID of a moving image material 1, 0002 set as the ID of a moving image material 2, and 0003 set as the ID of a moving image material 3.

Figure 7B:
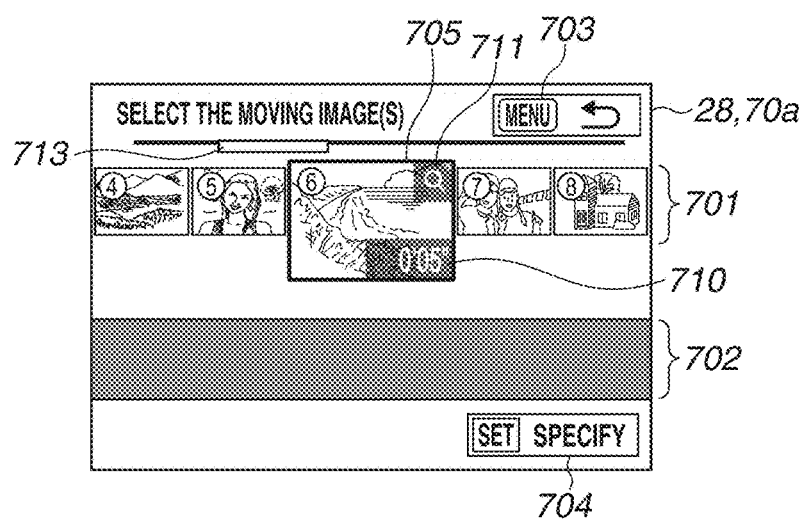
Figure 7C:
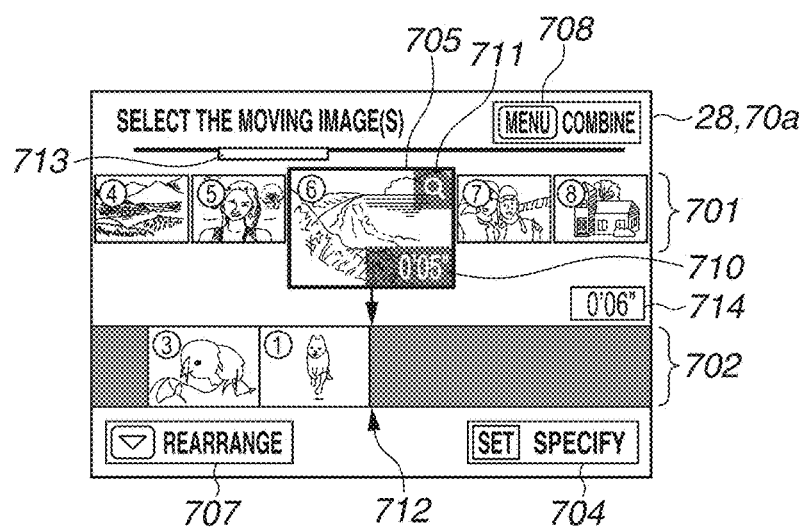
Figure 7D:
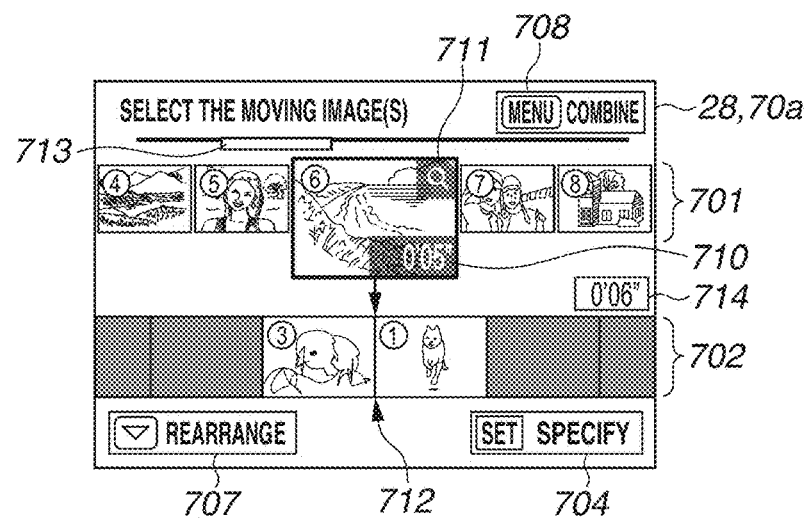
Figure 7E:
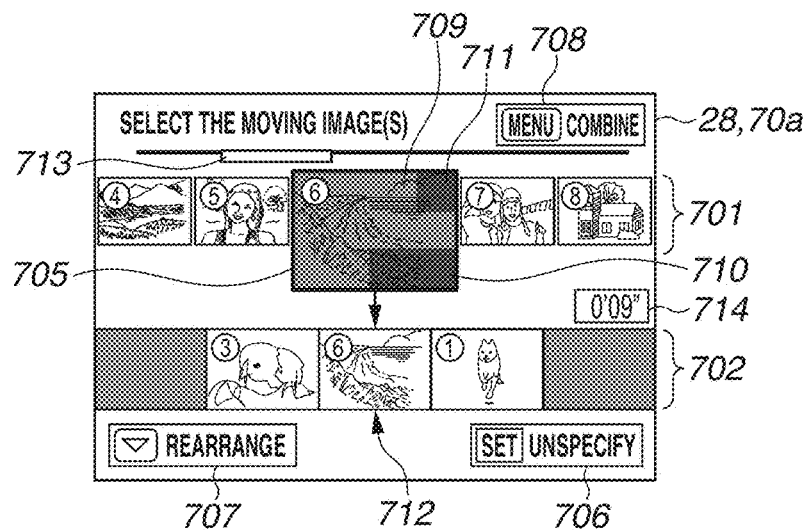
Figure 7F:
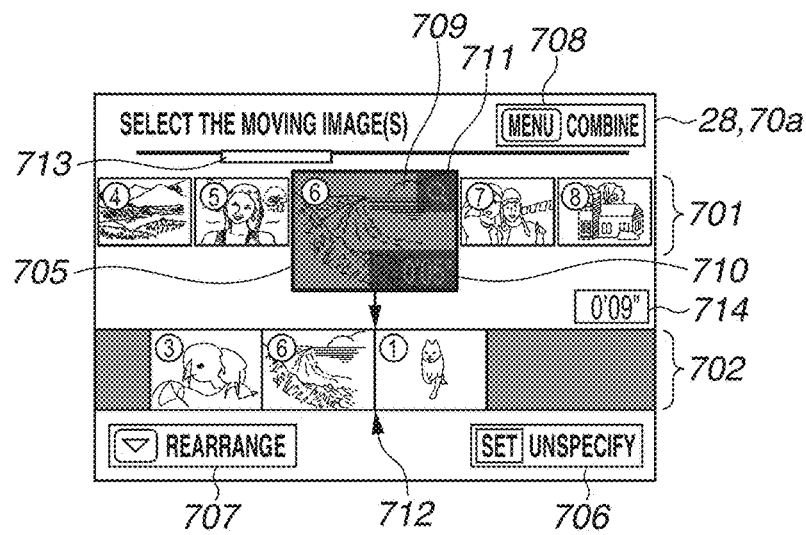

In step S304, the system control unit 50 displays the thumbnails corresponding to the IDs of the moving image materials recorded in the management file read out in step S303 in the rearrangement area 702 on the display unit 28. In more detail, the system control unit 50 displays the read thumbnails so as to fill a left space, as illustrated in FIG. 7C. Displaying the thumbnails so as to fill the left space in this manner enables the specified moving image material to be inserted at a last position in the rearrangement area 702 when the operation for specifying the moving image material is performed next, as will be described below. Alternatively, the system control unit 50 can display the thumbnails in the rearrangement area 702 so as to clear the center of the rearrangement area 702 (so as not to place any image at the center) (a center division display), as illustrated in FIGS. 7D and 7F. FIG. 7E illustrates a halfway state with the thumbnail in the middle of being moved toward the rearrangement area 702 (a state when the thumbnail is moved into the rearrangement area 702), and therefore illustrates the thumbnails laid out in a center focus display, which is not the center division display. In the center focus display, an odd number of thumbnails are displayed in such a manner that one thumbnail is displayed at the center of the area. In the center division display, an even number of thumbnails are displayed in such a manner that the center of the area is cleared (in such a manner that a same number of thumbnails are displayed on the left side and the right side from the center of the area). In other words, when the user rearranges the moving image material, the thumbnails are displayed in the rearrangement area 702 in a manner laid out at equal intervals (the thumbnail is also displayed at the central area) so as to make the order among the thumbnails easily understandable. When the user specifies the moving image material, the central area of the rearrangement area 702 is cleared, and the thumbnails of the moving image materials respectively previous and subsequent to a position where the moving image will be inserted are displayed so as to sandwich the central area therebetween, in order for the user to easily locate the position where the moving image to be specified will be inserted. In other words, the item row is laid out in such a manner that a boundary area between the thumbnails of the moving images respectively previous and subsequent to the position where the moving image to be selected from now will be inserted is located at the central position. In this manner, the moving image previous to the position where the moving image to be specified will be inserted (the rearrangement area 702), the moving image that is a candidate for the image to be inserted (the specifying area 701), and the subsequent moving image (the rearrangement area 702) are displayed in order horizontally, which enables the user to easily visualize the position where the moving image to be specified will be inserted and the arrangement order after the insertion. While the user is performing the operation for the rearrangement area 702, the boundary area does not overlap the central position and the thumbnail is displayed at the central position when the user specifies the moving image material.

In step S305, the system control unit 50 displays an initial screen. More specifically, the system control unit 50 brings the display unit 28 into a state where no thumbnail is displayed in the rearrangement area 702, as illustrated in FIGS. 7A and 7B. Since the system control unit 50 has determined not to generate the rest of the combined moving image in the process of generation in step S302, the system control unit 50 deletes the IDs of the moving image materials in the management file recorded in the recording medium 200 at this time. As described in the description of steps S301 to S305, the user can newly generate a combined moving image and can also generate a combined moving image so as to resume the previously engaged work. The digital camera 100 can be configured in such a manner that the management file for each of a plurality of short clip moving images is prepared in the recording medium 200. In this case, the digital camera 100 is configured to enable the user to select which combined moving image the user wants to edit to generate the rest of the combined moving image in the process of generation.

In step S306, the system control unit 50 displays the thumbnails in such a manner that the thumbnail is located at a horizontally central position of the specifying area 701 or the display unit 28 in the specifying area 701. More specifically, the system control unit 50 displays the thumbnails in such a manner that the thumbnail (thumbnail 8) is located at the center of the horizontal width of the display unit 28 and the specifying area 701, as indicated in the specifying area 701 illustrated in FIG. 7A. The system control unit 50 displays the frame 705 around the thumbnail displayed at the center (thumbnail 8). In this process, the system control unit 50 moves the thumbnail row including the other thumbnails (thumbnails 6 to 10) to display them (the center focus display). The thumbnails 6 to 10 are arranged in the horizontal direction of the specifying area 701, and the thumbnail 8 (the thumbnail corresponding to the selected moving image material) located at the horizontally central position of the specifying area 701 is displayed in a manner surrounded by the frame 705. This display indicates that the thumbnail 8 surrounded by the frame 705 is in a selected state. The selected thumbnail 8 is displayed at the central position. The thumbnail of the moving image material already specified to be contained in the moving images to be combined (the same thumbnail as that is also placed in the rearrangement area 702) is displayed in a gray-out manner in the specifying area 701.

In step S307, the system control unit 50 determines whether an instruction to end the processing for generating the combined moving image is issued. Examples include an operation for powering off the digital camera 100, and an operation for returning the operation mode to the playback mode by selecting the menu button 75 with no thumbnail displayed in the rearrangement area 702 (pressing the menu button 75 or performing the touch operation on a menu item 703 illustrated in FIGS. 7A and 7B). Additional examples include the instruction to capture an image, to perform wireless communication processing, etc. If the system control unit 50 determines that the instruction to end the processing for generating the combined moving image is issued (YES in step S307), the system control unit 50 ends the processing for generating the combined moving image. If not (NO in step S307), the processing proceeds to step S308. In this process, the management file of the combined moving image in the process of generation is recorded into the recording medium 200.

In step S308, the system control unit 50 determines whether a menu is selected when the thumbnail(s) is/are displayed in the rearrangement area 702. The system control unit 50 determines whether the menu is selected in step S308 based on whether the menu button 75 is pressed, or the touch operation is performed on a menu item 708 if the menu item 708 indicating the processing for combining is displayed. If the system control unit 50 determines that the menu is selected (YES in step S308), the processing proceeds to step S309. If not (NO in step S308), the processing proceeds to step S314. If a guide displayed together with a symbol representing the menu is not a guide indicating the processing for combining like the menu item 708 illustrated in FIG. 7C, but is a guide indicating a return to an original screen (the initial screen), like the menu item 703 illustrated in FIG. 7A, the system control unit 50 determines NO in step S308 (NO in step S308), and the processing proceeds to step S314. The menu item 708 is an item for issuing an instruction to combine the moving image materials with one another, and is displayed when one or more thumbnail(s) is/are displayed in the rearrangement area 702. The menu item 703 for issuing an instruction to return is displayed instead of the menu item 708 when no thumbnail is displayed in the rearrangement area 702 (no moving image material is specified). In other words, the instruction to combine the moving image materials with one another is input if the menu button 75 is pressed when the menu item 708 is displayed, while the instruction to return to the playback mode is input if the menu button 75 is pressed when the menu item 703 is displayed.

In step S309, the system control unit 50 displays a not-illustrated combination menu. Options, such as a preview, storage, a setting of background music (BGM), and a setting of a color effect, for performing combination processing are displayed on a combination menu screen. When the combination menu is displayed, the user can issue an instruction to return to the original screen for performing the processing for generating the combined moving image by pressing the menu button 75.

In step S310, the system control unit 50 determines whether the instruction to return from the combination menu screen to the screen for performing the processing for generating the combined moving image is issued (the menu button 75 is pressed). If the system control unit 50 determines that the return instruction is issued (YES in step S310), the processing proceeds to step S306. If not (NO in step S310), in step S311, the system control unit 50 performs the combination processing.

In step S311, the system control unit 50 performs processing according to an operation for selecting one of the options other than the storage that are displayed on the combination menu screen. This processing is processing, such as presenting the preview, setting the BGM, or setting the color effect, in the combination menu displayed in step S309. The user can confirm the combined moving image that is in the middle of being generated during the generation of the combined moving image by previewing the combined moving image. The user can select the BGM, the color effect, and the like to apply to the moving image material in the combined moving image, and therefore can generate the combined moving image that the user feels further interesting.

In step S312, the system control unit 50 determines whether the storage is selected from the combination menu displayed in step S309, and an instruction to store the generated combined moving image is issued by the user. If the system control unit 50 determines that the instruction to store the generated combined moving image is issued (YES in step S312), the processing proceeds to step S313. If not (NO in step S312), the processing returns to step S310.

In step S313, the system control unit 50 performs the combination processing for generating a single moving image (the combined moving image) by combining the plurality of moving image materials in the order recorded in the management file. The system control unit 50 newly assigns an ID to the generated combined moving image (the recording state of the edited management file) as the short clip combined moving image, and records (stores) this combined moving image into the recording medium 200. Upon an end of processing for recording the combined moving image, the system control unit 50 ends the processing for generating the combined moving image, and returns to the playback screen.

In step S314, the system control unit 50 determines whether a horizontal scroll instruction for the specifying area 701 is issued. The scroll instruction here is the scroll or the flick by the leftward/rightward Touch-Move in the specifying area 701, the pressing of the left/right key 73*a* or 73*b* of the four-way operational key 73 with some images selected in the specifying area 701, or the operation of rotating the dial 77. The system control unit 50 determines the direction of the scroll instruction based on the direction in which the thumbnails are arranged in the specifying area 701, and determines whether a vertical scroll instruction is issued if the thumbnails are arranged vertically. If the system control unit 50 determines that the scroll instruction is issued (YES in step S314), the processing proceeds to step S315. If not (NO in step S314), the processing proceeds to step S316. Each of the display screens illustrated in FIGS. 7A to 7F is an example of the display unit 28 when the moving image material in the specifying area 701 is selected, and the system control unit 50 determines whether the scroll instruction for the specifying area 701 is issued with the moving image material selected in the specifying area 701 (the thumbnail surrounded by the frame 705 in the specifying area 701) in this manner. The user can switch the thumbnails displayed in the specifying area 701 by performing the scroll operation with the specifying area 701 selected (the moving image specifying mode).

In step S315, the system control unit 50 scrolls (moves) the thumbnails displayed in the specifying area 701. FIGS. 7A and 7B illustrate an example of the display unit before and after the scroll instruction for the specifying area 701 is issued. In FIG. 7A, the thumbnail 8 is selected. When the scroll operation by the Touch-Move is performed to the right by a distance corresponding to widths of two thumbnails in this state, or the left key 73*a* is pressed twice, the thumbnail 6 (the moving image material 6), which is the second thumbnail to the left of the thumbnail 8, is selected as illustrated in FIG. 7B. Alternatively, the scroll instruction can also be issued with the flick operation or the operation of rotating the dial 77 to the left by two marks. If the scroll instruction is issued with the flick operation, the distance thereof is determined according to the speed at which the flick operation is performed. In the present exemplary embodiment, since the selected thumbnail is displayed at the center of the area (the position of the frame 705 for selection is fixed), if the scroll instruction is issued with the operation performed on the operation member, an operation for selecting the item located to the left causes the thumbnail row to be scrolled to the right so as to place the item located to the left at the center. The issue of the scroll instruction with the thumbnails 6 to 10 displayed as illustrated in FIG. 7A results in, for example, a display of the thumbnails 4 to 8 as illustrated in FIG. 7B. In this manner, the issue of the scroll instruction in the specifying area 701 enables the user to switch the displayed thumbnails, whereby the user can select the moving image material to specify without choices thereof limited to the currently displayed thumbnails. In other words, even when there is only a limited display area available, like the digital camera 100, the user can perform the instruction operation from thumbnails as many as a number that makes the display area insufficient to display all of them by scrolling the display area. The thumbnail of the selected moving image material is displayed in a larger size than the other thumbnails, which facilitates confirmation of how the moving image looks like and the details of the moving image. A duration 710 and an enlargement mark 711 illustrated in FIGS. 7A and 7B are displayed in a manner superimposed on the selected thumbnail for two seconds after the thumbnail is selected. The duration 710 indicates a playback duration of the moving image material corresponding to the selected thumbnail, and the enlargement mark 711 is a display indicating that the moving image material can be played back with the enlargement operation. The duration 710 and the enlargement mark 711 notify the user of the playback duration and how to play back the moving image material, respectively.

In step S316, the system control unit 50 determines whether an instruction to play back the moving image material corresponding to the selected thumbnail is issued. As described above, the moving image material can be played back with the operation for enlarging the image as indicated by the enlargement mark 711 displayed in the manner superimposed on the thumbnail 8 illustrated in FIG. 7A or the thumbnail 6 illustrated in FIG. 7B. In other words, the system control unit 50 determines whether the operation of rotating the scaling ratio switching bar 76 to the right (the operation for enlarging the image) is performed. Alternatively, the digital camera 100 can be configured to enable the user to input the instruction to play back the moving image material with a pinch-out operation (an operation of touching two points and performing the Touch-Move so as to separate the touch points away from each other) for the selected thumbnail. If the system control unit 50 determines that the instruction to play back the selected moving image material is issued (YES in step S316), the processing proceeds to step S317. If not (NO in step S316), the processing proceeds to step S318.

In step S317, the system control unit 50 plays back the moving image material selected when the instruction to play back the moving image material has been issued in step S316. When the moving image material is played back, the screen is switched from the editing screen including the specifying area 701 and the rearrangement area 702 to the playback screen. Upon an end of the playback of the moving image material, the screen returns to the original editing screen displayed when the instruction to play back the moving image material has been issued. In this manner, the user can easily confirm the content of the moving image by playing back the moving image material in the middle of the operation for specifying the moving image material to rearrange. Therefore, the user can play back the moving image material by issuing the playback instruction on the specifying area 701 even without performing operations for switching the screen from the editing screen where the combined moving image is generated to the screen where the image is played back, and further selecting the image to play back. Since the screen returns to the original editing screen even without the user performing the operation after the end of the playback of the moving image material, the user can immediately perform the operation for specifying the moving image material, the operation for unspecifying the moving image material, and the operation for rearranging the moving image material on the moving image material with respect to which the user has confirmed the content of the moving image.

In step S318, the system control unit 50 determines whether an operation for applying SET to (specifying or unspecifying) the moving image material is performed. Types of the operation for applying SET to the moving image material include the operation for specifying the moving image material and the operation for unspecifying the moving image material, and this operation is input as the operation for unspecifying the moving image material if the moving image material targeted by the operation is already specified (already-specified or already-moved) while being input as the operation for specifying the moving image material if the moving image material targeted by the operation is not specified yet (non-specified), even though the same operation is performed between these cases. An item representing SET indicates the instruction to unspecify the moving image material if the selected moving image material is already-specified while an item representing SET indicates the instruction to specify the moving image material if the selected moving image material is non-specified, even though they are a same SET item (704 or 706). In other words, the operation for specifying the moving image material and the operation for unspecifying the moving image material can be performed with an operation of touching the item 704 illustrated in FIGS. 7A to 7D and an operation of touching the item 706 illustrated in FIGS. 7E and 7F, respectively. Alternatively, SET can also be applied to the moving image material with the pressing of the SET button 74. The pressing of the SET button 74 is input as the instruction to specify the moving image material if the item 704 is displayed (i.e., the selected moving image material is non-specified) when the SET button is pressed, while being input as the instruction to unspecify the moving image material if the item 706 is displayed (i.e., the selected moving image material is already-specified) when the SET button 74 is pressed. The operation for applying SET to the moving image material (specifying the moving image material) selected at the time of the operation can also be performed with the downward flick operation from the specifying area 701 to the rearrangement area 702 or a series of touch operations constituted by the Touch-On and the Touch-UP (the operation of touching the item and then releasing the touch). If the system control unit 50 determines that the operation for applying SET to the moving image material is performed (YES in step S318), the processing proceeds to step S319, in which the system control unit 50 performs processing for specifying/unspecifying the image, which will be described with reference to FIG. 4. If not (NO in step S318), the processing proceeds to step S320.

In step S319, the system control unit 50 performs the processing for specifying/unspecifying the image. The processing for specifying/unspecifying the image will be described below with reference to FIG. 4.

In step S320, the system control unit 50 determines whether the scroll instruction for the rearrangement area 702 is issued. The processing illustrated in FIGS. 3A and 3B indicates processing in the moving image specifying mode for specifying the moving image material, and the digital camera 100 accepts the scroll instruction (a user operation) for the rearrangement area 702 even in the moving image specifying mode. The scroll instruction can be issued with the drag or flick operation by the leftward/rightward (horizontal) Touch-Move in the rearrangement area 702. However, the operation performed on the dial 77 or the four-way operational key 73 is processed as the operation for the specifying area 701 since the current operation mode is the moving image specifying mode and the specifying area 701 is in an active state. As illustrated in FIGS. 7C and 7D, when the rightward scroll instruction for the rearrangement area 702 is issued in the moving image specifying mode with the thumbnail 6 selected, the position where the thumbnail 6 will be inserted can be changed. More specifically, the thumbnail 6 is inserted at a position subsequent to the thumbnail 1 (moving image material 1) if the operation for specifying the thumbnail 6 is performed in the state illustrated in FIG. 7C, but is inserted at a position between the thumbnails 3 and 1 if the operation for specifying the thumbnail 6 is performed in the state illustrated in FIG. 7D. In this manner, the digital camera 100 accepts the scroll instruction for the rearrangement area 702 even in the moving image specifying mode, so that the user can insert the moving image material at a desired position by performing the operation for specifying the moving image material after deciding the position to insert the moving image material. If the system control unit 50 determines that the scroll instruction for the rearrangement area 702 is issued (YES in step S320), the processing proceeds to step S321. If not (NO in step S320), the processing proceeds to step S322.

In step S321, the system control unit 50 displays an animation in which the thumbnail row displayed in the rearrangement area 702 is moved (presents a scroll display). For example, if the instruction to scroll the thumbnail row to the right by one thumbnail is issued when the thumbnails 3 and 1 are positioned as illustrated in FIG. 7C, the thumbnail row is moved to the right by one thumbnail to a position where the thumbnails 3 and 1 are displayed in FIG. 7D. When the instruction issued in the rearrangement area 702 is not the rearrangement operation but the scroll instruction for switching the display, the management file maintains the same recording state.

In step S322, the system control unit 50 determines whether the rearrangement area 702 is selected. The rearrangement area 702 can be selected with the tap operation on the rearrangement area 702. Alternatively, the rearrangement area 702 can also be selected with the pressing of the down key 73d, or the touch operation on an item 707 indicating switching to a rearrangement mode illustrated in FIGS. 7C to 7F. However, the scroll instruction for the rearrangement area 702 in the moving image specifying mode only causes the movements of the displayed specified images as described in the description of step S320, and does not lead to the selection of the rearrangement area 702. When the rearrangement area 702 is selected, the operation mode is switched to the rearrangement mode. If the system control unit 50 determines that the rearrangement area 702 is selected (YES in step S322), the processing proceeds to step S323. If not (NO in step S322), the processing returns to step S306.

Figure 9A:
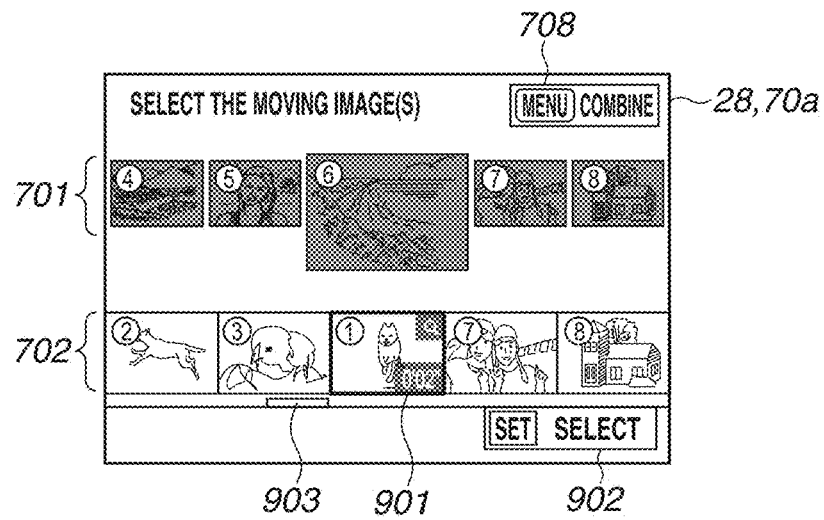
FIGS. 9A and 9B are diagrams each illustrating a display example of displayed thumbnails in a rearrangement area.
Figure 9B:
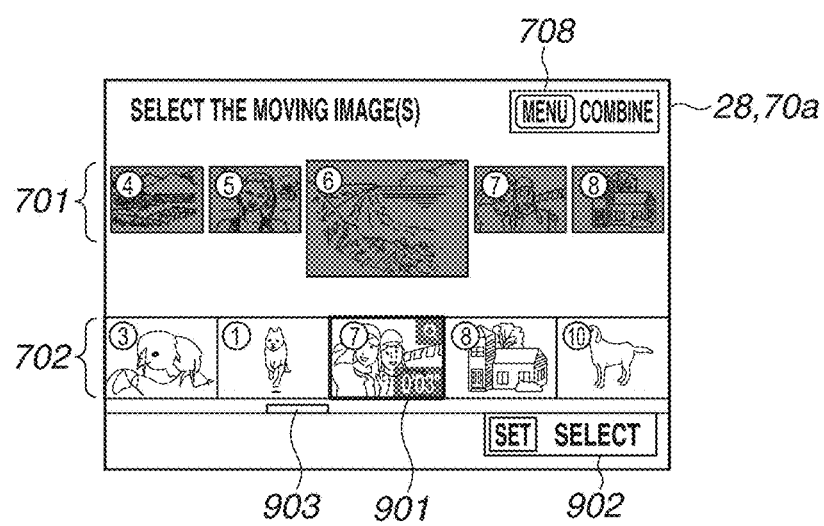
Figure 9C:
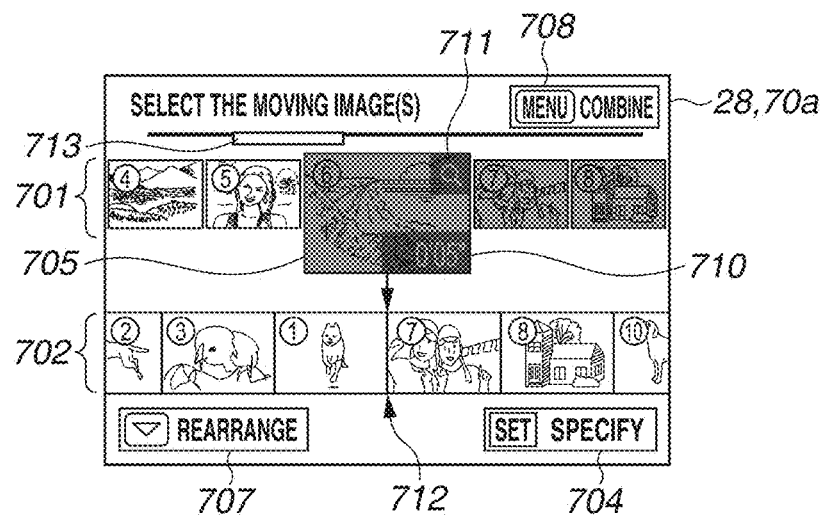
FIG. 9C is a diagram illustrating a display example of when an operation mode is switched to a moving image specifying mode.

In step S323, the system control unit 50 performs processing in the rearrangement mode. The processing in the rearrangement mode will be described with reference to FIGS. 5A and 5B. When the operation mode is switched to the rearrangement mode, the thumbnails displayed in the selected state in the specifying area 701 are shifted into an unselected state. When the digital camera 100 is in the moving image specifying mode, the thumbnails in the specifying area 701 are in the selected state, and a scroll bar 713 is displayed in the specifying area 701 and the thumbnails in the specifying area 701 are moved when the dial 77 is rotationally operated. When the digital camera 100 is in the rearrangement mode, the thumbnails in the rearrangement area 702 are in the selected state, and a scroll bar 903 is displayed in the rearrangement area 702 as illustrated in FIGS. 9A to 9C and the thumbnails in the rearrangement area 702 are moved when the dial 77 is rotationally operated.

In this manner, the user can switch, within the same screen, the mode for performing any of the operation for specifying the moving image material and the operation for rearranging the moving image material.

In the moving image specifying mode in the processing for generating the combined moving image, the user can switch the thumbnails of the moving image materials displayed on the display unit 28 by scrolling them in the specifying area 701 and the rearrangement area 702.

Next, the processing for specifying/unspecifying the image according to the present exemplary embodiment will be described with reference to FIG. 4. The program recorded in the nonvolatile memory 56 is loaded to the system memory 52 and is executed by the system control unit 50, by which this processing is realized. This processing is detailed processing of step S319 illustrated in FIG. 3B.

Figure 3B:
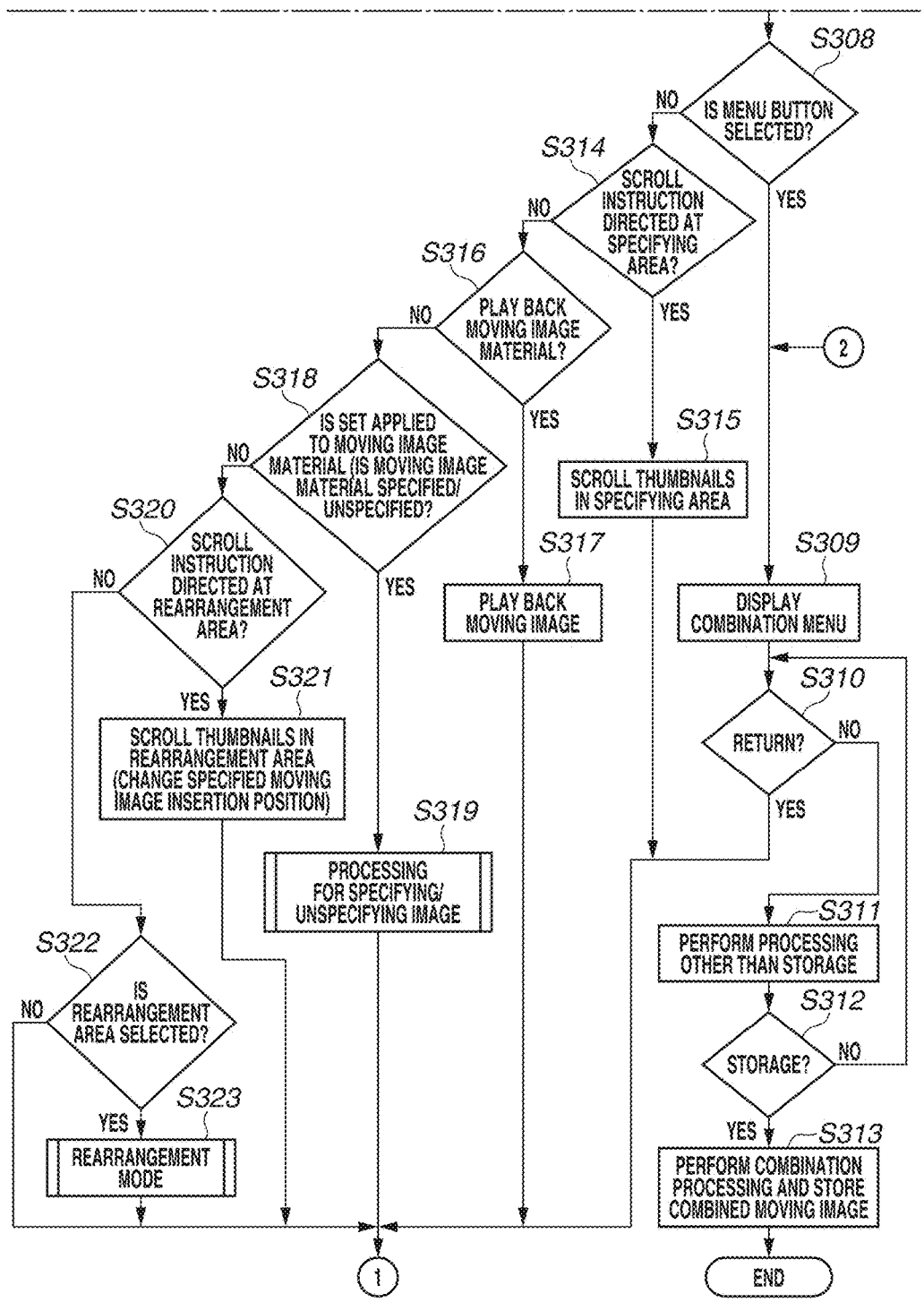

In step S401, the system control unit 50 refers to the management file, and determines whether the moving image material set in the selected state in the specifying area 701 in step S318 illustrated in FIG. 3B is already-specified (the specified moving image material) as the moving image material to be contained in the combined moving image. When the thumbnail 6 is in a non-specified state as illustrated in FIGS. 7A to 7C, this indicates that the moving image material 6 is the non-specified moving image material. When the thumbnail 6 is displayed in such a display manner 709 that the thumbnail 6 is hatched (a gray-out display) as illustrated in FIGS. 7E and 7F, this display indicates that the moving image material 6 is the already-specified moving image material. In this manner, the thumbnail corresponding to the already-specified moving image material is displayed in a display manner that makes this thumbnail distinguishable from the non-specified thumbnail (a distinguishable display). Therefore, the user can recognize whether the moving image material is non-specified or already-specified due to the display manner of the thumbnail 6. The ID of the already-specified moving image material is written into the management file illustrated in FIGS. 14A to 14F. FIG. 14A illustrates the recording state of the management file at the time of FIGS. 7C and 7D, in which the moving image material 3 and the moving image material 1 are recorded as the already-specified moving image materials. The moving image material 6 in the selected state in FIG. 7C is non-specified in this state. FIG. 14B illustrates the recording state of the management file at the time of FIGS. 7E and 7F, in which the moving image material 3, the moving image material 6, and the moving image material 1 are recorded as the already-specified moving image materials, and the moving image material 6 in the selected state in FIG. 7E is already-specified.

In step S402, the system control unit 50 displays an animation in such a manner that the moving image material specified (to which SET has been applied) in step S318 illustrated in FIG. 3B is moved to a specified moving image insertion position 712, which is the central position in the rearrangement area 702, as illustrated in FIGS. 7D and 7E. In other words, the thumbnail 6 in the specifying area 701 is moved into the rearrangement area 702 so as to be inserted between the thumbnail 3 and the thumbnail 1. At the same time, the thumbnails originally displayed in the rearrangement area 702 are moved by a distance as long as the newly inserted thumbnail. For example, the system control unit 50 displays an animation in which the thumbnail 3 and the thumbnail 1 illustrated in FIG. 7D are being gradually moved outwardly by a distance as long as a width of the thumbnail 6 so as to be displaced to respective positions of the thumbnail 3 and the thumbnail 1 illustrated in FIG. 7E.

The specified moving image insertion position 712 is the central position of the rearrangement area 702 in the left/right direction, and is a position immediately below the selected image in the specifying area 701 (located at a same horizontal coordinate as the selected image in the specifying area 701). The specified moving image insertion position 712 is the position between the thumbnail 3 and the thumbnail 1 in the rearrangement area 702 illustrated in FIG. 7D. If the operation for specifying the moving image material is performed with the downward flick operation, the operation can be performed intuitively with an operation as if dropping the moving image material from the specifying area 701 into the rearrangement area 702. The specified moving image material is inserted so as to be arranged at a number in the order that is subsequent to the thumbnail (the specified moving image material) arranged to the left of the specified moving image insertion position 712, and also at a number in the order that is previous to the thumbnail (the specified moving image material) arranged to the right of the specified moving image insertion position 712, among the specified moving image materials displayed in the rearrangement area 702. Even when there is only one specified moving image material or no specified moving image material in the rearrangement area 702, the thumbnail is also moved from the specifying area 701 to the specified moving image insertion position 712.

In step S403, the system control unit 50 records the ID of the specified moving image material at a specified position (a number of the specified moving image material in the playback order in the combined moving image) in the management file. As described above, the moving image material 3 and the moving image material 1 are recorded as the already-specified moving image materials in the management file illustrated in FIG. 14A. When the moving image material 6 is inserted at the specified moving image insertion position 712 (the position between the moving image material 3 and the moving image material 1) illustrated in FIG. 7D, the ID of the moving image material is recorded at the number between the moving image material 3 and the moving image material 1 in the order, like the management file illustrated in FIG. 14B. In other words, the ID of the moving image material 1 is recorded while the number thereof in the playback order is changed from m+1 to m+2. In this manner, the specified moving image material is recorded in correspondence with the position in the playback order (the rearranged order) specified by the user in advance in the management file. An item 714 indicates a total of playback durations of the specified moving image materials, and the user can recognize a playback duration of the entire combined moving image. When the moving image material is newly specified, the total of playback durations is changed to the one including the playback duration of the newly specified moving image material.

In step S404, the system control unit 50 displays the moving image material specified (to which SET has been applied) in step S318 illustrated in FIG. 3B in the display manner 709 indicating the specified state, like the thumbnail 6 illustrated in FIGS. 7E and 7F, as described above.

In step S405, the system control unit 50 changes the layout of the specified moving image materials in the rearrangement area 702 to the center division display. More specifically, from the state presenting the center focus display as illustrated in FIG. 7E, the system control unit 50 moves the specified moving image materials to the left by half the length of the width of the thumbnail as illustrated in FIG. 7F to clear the central position (the specified moving image insertion position 712), thereby presenting the center division display. As a result, the specified moving image insertion position 712 is arranged at a position immediately subsequent to the moving image material inserted just now (the moving image material 6).

Processing of steps S406 to S409 is not the processing for specifying the moving image material in steps S402 to S405 but is the processing for unspecifying the already-specified moving image material into the non-specified state.

Figure 8A:
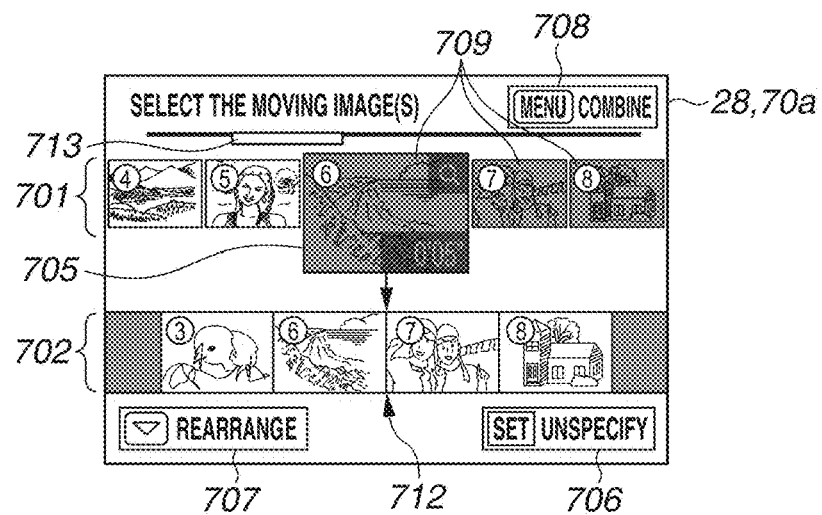
FIGS. 8A to 8C are diagrams illustrating an example of how a specified image is unspecified with an operation for a specifying area.
Figure 8B:
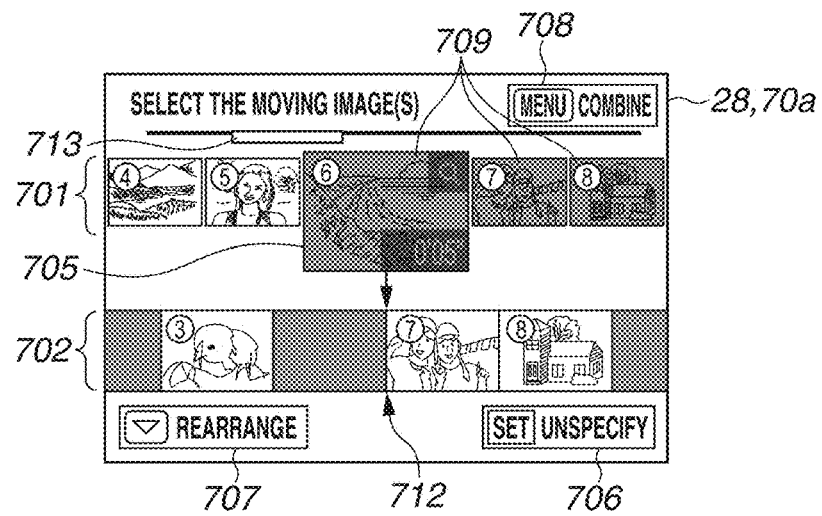
Figure 8C:
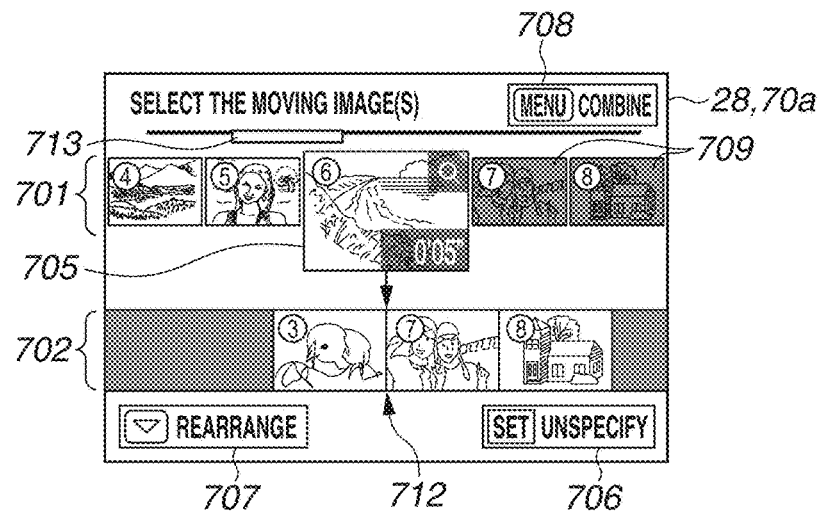

In step S406, the system control unit 50 displays such an animation that the unspecified specified moving image material (the thumbnail) placed in the rearrangement area 702 is moved from the rearrangement area 702 into the specifying area 701. FIGS. 8A to 8C illustrate, in an order of FIGS. 8A to 8C, an example of how the specified moving image material in the rearrangement area 702 is returned into the specifying area 701 with an operation for the specifying area 701. If the operation for unspecifying the moving image material is performed when the thumbnail 6 in the specified state in the specifying area 701 is selected as illustrated in FIG. 8A, the thumbnail 6 located in the rearrangement area 702 is being gradually moved so as to be displaced to the thumbnail 6 displayed in the display manner 709 in the specifying area 701. The display of the thumbnail 6 is removed from the rearrangement area 702 as illustrated in FIG. 8B.

In step S407, the system control unit 50 deletes (issues an instruction to delete) the ID of the unspecified specified moving image material from the management file. FIG. 14C illustrates the recording state of the management file at the time of FIG. 8A, and FIG. 14D illustrates the recording state of the management file at the time of FIG. 8C. The ID of the moving image material 6 is recorded in the management file illustrated in FIG. 14C, but is deleted from the management file once the operation for unspecifying the moving image material 6 from the specified state is performed as in step S406. The subsequent moving image materials advance in the order so as to fill the space where the unspecified moving image material used to be recorded, which results in the recording state of the management file illustrated in FIG. 14D.

In step S408, the system control unit 50 changes the display manner of the thumbnail corresponding to the unspecified moving image material displayed in the specifying area 701 to the display manner indicating the non-specified state (the original display manner before the moving image material is specified). The system control unit 50 switches the display manner of the thumbnail 6 in the specifying area 701 to the non-specified state so as to change the display manner of the thumbnail 6 from the display manner 709 of the thumbnail 6 in the specifying area 701 illustrated in FIG. 8B to a display manner of the thumbnail 6 in the specifying area 701 illustrated in FIG. 8C.

In step S409, the system control unit 50 displays an animation in which the thumbnails located in the rearrangement area 702 are moved so as to fill a width where the unspecified thumbnail used to be displayed. The thumbnails in the rearrangement area 702 are being gradually moved so as to fill a space emptied due to the removal of the display of the specified moving image material from the rearrangement area 702 in step S405 (there is a space as wide as one thumbnail between the thumbnail 3 and the thumbnail 7 in the rearrangement area 702 illustrated in FIG. 8B). However, when the digital camera 100 is in the moving image specifying mode, the thumbnails in the rearrangement area 702 are moved so as to be laid out in the center division display.

Since being able to specify and unspecify the moving image material in the moving image specifying mode (the specifying area 701) in this manner, the user can further easily search for the moving image material from the chronologically arranged thumbnails. Since being able to unspecify the moving image material, the user does not have to switch the operation mode to the rearrangement mode and search for the moving image material to unspecify from the rearrangement area 702, which contributes to the improvement of the operational usability.

When specifying the moving image material, the user can insert the moving image material to contain in the combined moving image at the user's desired position in the playback order. Therefore, the user can insert the moving image material at the desired position in the combined moving image with the operation for specifying the moving image material after specifying the position to insert the moving image material even without transitioning to the screen for rearranging the specified moving image material after specifying the moving image material, which contributes to the improvement of the operational usability of the operation for generating the combined moving image. Even when the size of the display area of the display unit 28 is limited, like the digital camera 100, so that the display area is not large enough to fully display the moving image materials to be contained in the combined moving image, the user can change the position where the moving image material to be specified will be inserted with the scroll instruction for the rearrangement area 702.

According to the present exemplary embodiment, the display of the thumbnail corresponding to the unspecified moving image material is removed from the rearrangement area 702 when the moving image material is unspecified. Alternatively, the thumbnail can be gradually faded out or grayed out.

Next, the processing in the rearrangement mode according to the present exemplary embodiment will be described with reference to FIGS. 5A and 5B. The program recorded in the nonvolatile memory 56 is loaded to the system memory 52 and is executed by the system control unit 50, by which this processing is realized. This processing is detailed processing of step S323 illustrated in FIG. 3B.

In step S501, the system control unit 50 displays the thumbnails in the specifying area 701 in the center focus display, and displays the thumbnails in the rearrangement area 702 in the center focus display and displays a frame 901 around the thumbnail located at the center, as illustrated in FIGS. 9A and 9B. The frame 901 indicates the selected thumbnail, and is displayed so as to surround the thumbnail 1 in FIG. 9A and the thumbnail 7 in FIG. 9B. FIGS. 9A and 9B illustrate an example of the display when an operation for moving the thumbnail in the rearrangement area 702 is performed (when SET is not applied to a rearrangement moving image material).

In step S502, the system control unit 50 determines whether the menu is selected (whether the menu button 75 is pressed, or whether the touch operation is performed on the menu item 708 if the menu item 708 indicating the processing for combining is displayed), similarly to step S308 illustrated in FIG. 3B. If the system control unit 50 determines that the menu is selected (YES in step S502), the processing proceeds to step S309 illustrated in FIG. 3B. If not (NO in step S502), the processing proceeds to step S503.

In step S503, the system control unit 50 determines whether the specifying area 701 is selected (whether the operation mode is switched to the moving image specifying mode). The specifying area 701 can be selected with the tap operation on the specifying area 701 (provided that the rearrangement moving image material is not specified in the rearrangement area 702), or the pressing of the up key 73c of the four-way operational key 73. If the system control unit 50 determines that the specifying area 701 is selected (YES in step S503), the system control unit 50 ends the rearrangement mode, and the processing proceeds to step S306 illustrated in FIG. 3A, from which the system control unit 50 performs the processing in the moving image specifying mode. If the system control unit 50 determines that the specifying area 701 is not selected (NO in step S503), the processing proceeds to step S504. When the thumbnail 6 in the specifying area 701 is selected from the state in which the thumbnail 1 in the rearrangement area 702 is selected as illustrated in FIG. 9A, the screen is switched to the screen in the moving image specifying mode as illustrated in FIG. 9C. FIG. 9C illustrates an example of the display when the operation mode is switched from the state illustrated in FIG. 9A to the moving image specifying mode. In this process, since the operation mode is switched to the moving image specifying mode, the display of the thumbnails in the rearrangement area 702 is switched from the center focus display to the center division display (the thumbnails in the rearrangement area 702 are moved to the left by half the width of the thumbnail) so as to facilitate the operation for specifying the moving image material. The thumbnail located at the center of the specifying area 701 (the thumbnail 6 in FIG. 9C) is shifted into the selected state.

In step S504, the system control unit 50 determines whether SET is applied to the rearrangement moving image material (whether the rearrangement moving image material is selected). SET can be applied to the moving image material (the moving image material can be selected) with the touch operation on an item 902 for selecting the moving image material to be rearranged (an item to be selected) illustrated in FIGS. 9A and 9B, or the pressing of the SET button 74 as indicated by the item 902. If the system control unit 50 determines that SET is applied to the rearrangement moving image material (the rearrangement moving image material is selected) (YES in step S504), the processing proceeds to step S514. If not (NO in step S504), the processing proceeds to step S505.

In step S505, the system control unit 50 determines whether the instruction to play back the selected moving image material is issued, similarly to step S316 illustrated in FIG. 3B. If the system control unit 50 determines that the instruction to play back the selected moving image material is issued (YES in step S505), the processing proceeds to step S506. If not (NO in step S505), the processing proceeds to step S507.

In step S506, the system control unit 50 plays back the moving image material selected when the instruction to play back the moving image material has been issued in step S505, similarly to step S317 illustrated in FIG. 3B.

In step S507, the system control unit 50 determines whether the horizontal scroll instruction for the rearrangement area 702 is issued. Since the thumbnails in the rearrangement area 702 are in the selected state when the processing proceeds to step S507, the scroll instruction for the rearrangement area 702 can also be issued with the operation on the dial 77 or the four-way operational key 73, unlike the scroll instruction at the time of step S320 illustrated in FIG. 3B. In other words, in step S507, execution of any of the drag or flick operation by the horizontal Touch-Move in the rearrangement area 702 and the operation on the dial 77 or the left/right key 73a or 73b results in an input of the horizontal scroll operation for the rearrangement area 702. If the system control unit 50 determines that the scroll instruction is issued (YES in step S507), the processing proceeds to step S508. If not (NO in step S507), the processing proceeds to step S509. In step S507, the scroll instruction can also be issued with the scroll operation and the flick operation by the touch operation on the rearrangement area 702.

In step S508, the system control unit 50 displays an animation in which the displayed thumbnail row in the rearrangement area 702 is moved (the scroll display). FIGS. 9A and 9B illustrate an example of the display unit 28 before and after the scroll instruction is issued. When the scroll instruction to scroll the thumbnail row in the rearrangement area 702 to the left by the distance corresponding to the width of one thumbnail is issued or the right key 73b is pressed once with the thumbnail 1 selected as illustrated in FIG. 9A, the selection is switched to the thumbnail 7 (the moving image material 7) located immediately next to the thumbnail 1 on the right as illustrated in FIG. 9B. The thumbnails displayed in the rearrangement area 702 are being gradually moved to the left by one thumbnail, and the thumbnail 7 is displayed in the selected state as illustrated in FIG. 9B when the thumbnail 7 reaches the central position. For two seconds after the thumbnail 7 is newly selected, the playback duration of the moving image material corresponding to the selected thumbnail 7 is displayed in a manner superimposed on this thumbnail 7, so that the user can confirm the playback duration. When the scroll instruction is issued with the thumbnails 2, 3, 1, 7, and 8 displayed as illustrated in FIG. 9A, for example, the displayed thumbnails are switched to the thumbnails 3, 1, 7, 8, and 10 as illustrated in FIG. 9B. Even when the rearrangement area 702 is not large enough to display all of the specified moving image materials, the user can switch the displayed thumbnails with the scroll instruction. Therefore, even when there is only a limited display area available, like the digital camera 100, the user does not have to make the selection from limited choices.

In step S509, the system control unit 50 determines whether the upward flick operation (the operation for unspecifying the specified image) is performed on the thumbnail located at the center of the rearrangement area 702. In the case of FIG. 9A, the system control unit 50 determines whether the upward flick operation (the touch operation as if moving the thumbnail 1 from the rearrangement area 702 into the specifying area 701) is performed on the thumbnail 1. If the system control unit 50 determines that the upward flick operation is performed on the thumbnail (YES in step S509), the processing proceeds to step S510. If not (NO in step S510), the processing proceeds to step S513.

Figure 4:
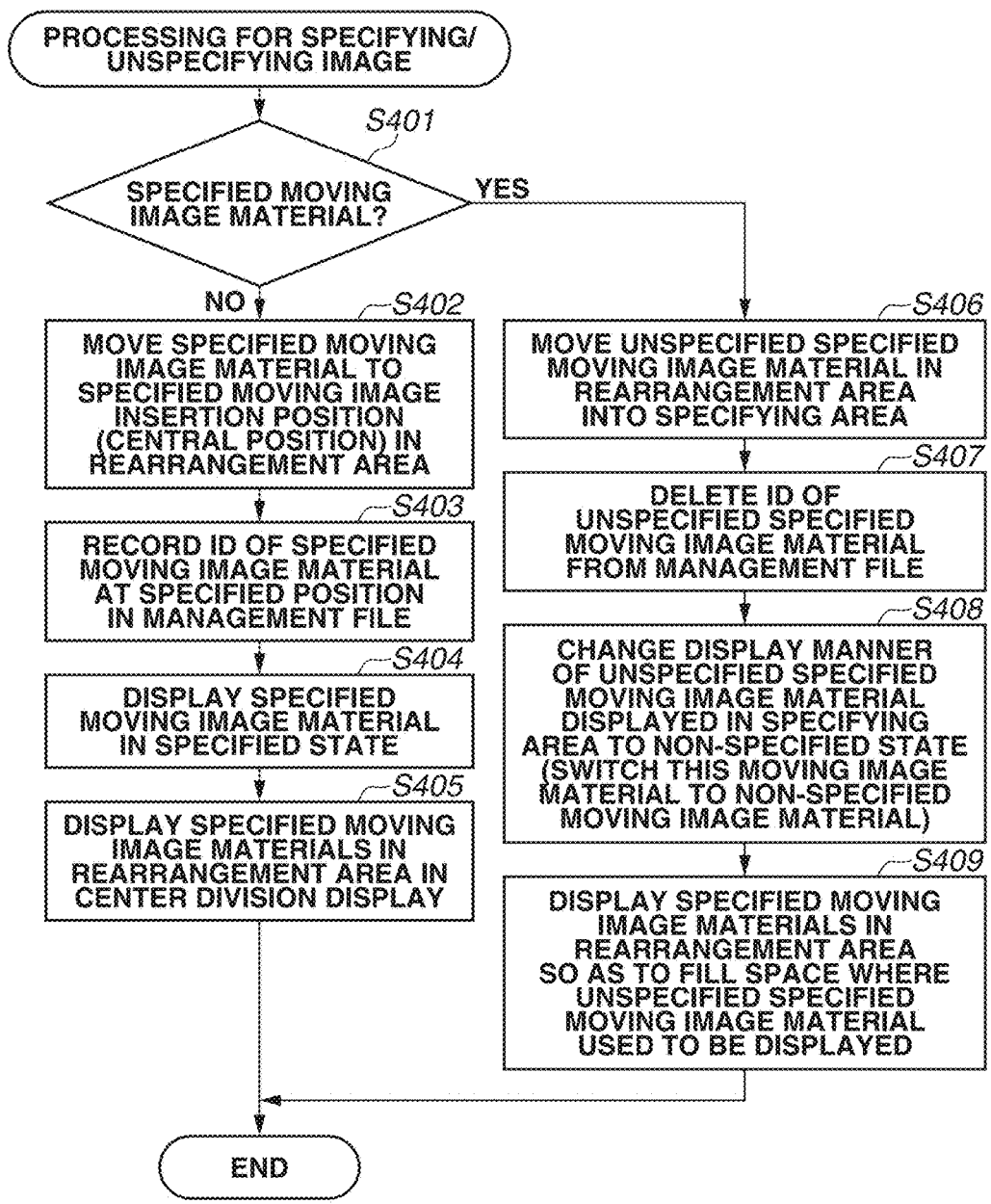
FIG. 4 is a flowchart illustrating processing for unspecifying an image.

Processing of steps S510 to S512 is the processing for returning the thumbnail (the image) in the rearrangement area 702 to the specifying area 701 that is performed in steps S406 to S409 illustrated in FIG. 4. However, the display manner of the thumbnail in the specifying area 701 is not switched like step S408, because the thumbnails displayed in the specifying area 701 when the digital camera 100 is in the rearrangement mode are displayed in the gray-out manner.

Figure 10A:
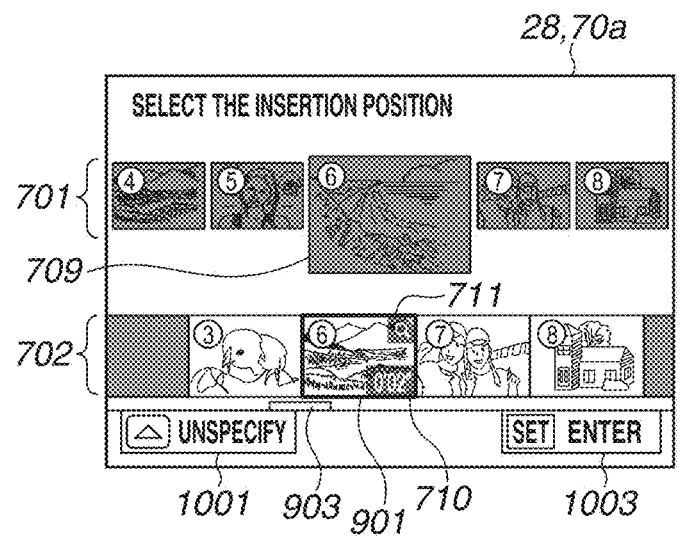
FIGS. 10A to 10C are diagrams illustrating an example of how a specified image is unspecified with an operation for the rearrangement area.
Figure 10B:
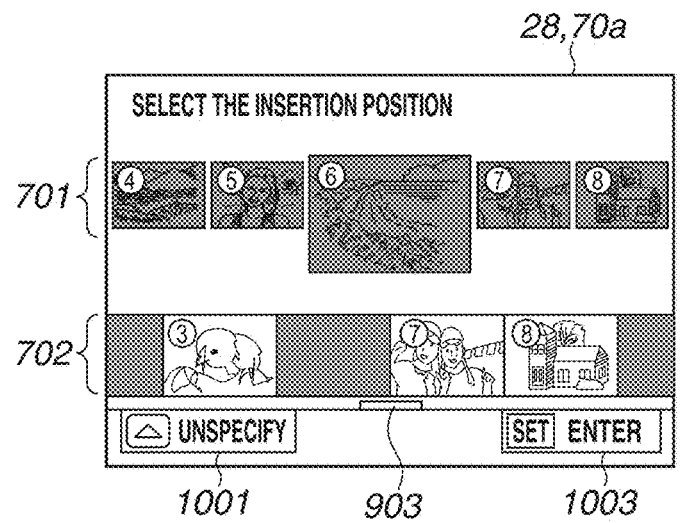
Figure 10C:
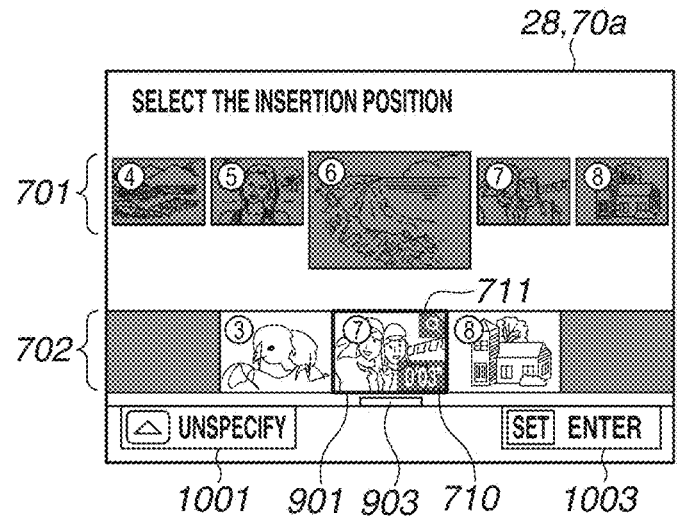

In step S510, the system control unit 50 displays an animation in which the specified moving image material (the thumbnail) located at the center of the rearrangement area 702 is moved from the rearrangement area 702 into the specifying area 701. FIGS. 10A to 10C illustrate, in an order of FIGS. 10A to 10C, an example of how the specified moving image material in the rearrangement area 702 is returned to the specifying area 701 (the specified moving image material is unspecified) with the operation for the rearrangement area 702, unlike FIGS. 8A to 8C. The thumbnail 6 located at the center of the rearrangement area 702 is moved so as to be displaced toward the thumbnail 6 displayed in the specified state in the specifying area 701, as illustrated in FIG. 10A. In other words, the display of the thumbnail 6 is removed from the rearrangement area 702, as illustrated in FIG. 10B. When the operation for unspecifying the specified moving image material in the rearrangement area 702 is performed, the corresponding thumbnail does not necessarily have to be displayed in the specifying area 701.

In step S511, the system control unit 50 deletes the ID of the unspecified specified moving image material from the management file.

In step S512, the system control unit 50 displays an animation in which the thumbnails located in the rearrangement area 702 are moved so as to fill a width where the unspecified thumbnail used to be displayed. As illustrated in FIG. 10C, the thumbnails are being gradually moved so as to fill a space emptied due to the removal of the display of the specified moving image material from the rearrangement area 702 in step S510 (there is a space as wide as one thumbnail between the thumbnail 3 and the thumbnail 7 in the rearrangement area 702 illustrated in FIG. 10B). The thumbnail corresponding to the moving image material (the moving image material 7 in FIG. 10C) next to the unspecified moving image material is moved so as to be located at the center.

In step S513, the system control unit 50 determines whether the specifying area 701 is selected, similarly to step S503. If the system control unit 50 determines that the specifying area 701 is selected (YES in step S513), the processing proceeds to step S306 illustrated in FIG. 3A. If not (NO in step S513), the processing proceeds to step S501.

Figure 11A:
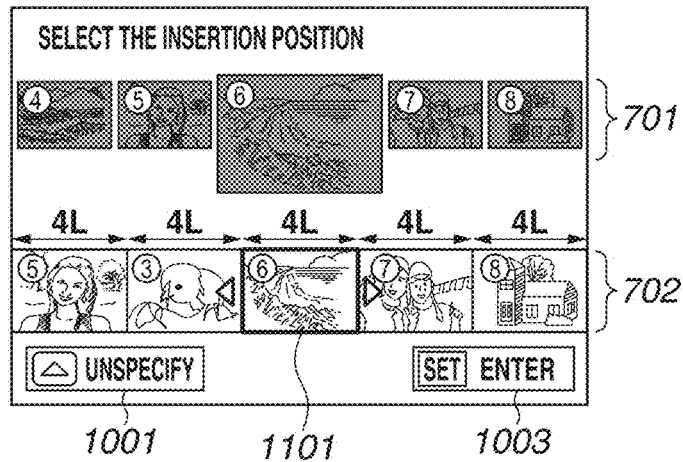
FIGS. 11A to 11E are diagrams illustrating how the rearrangement animation is displayed.

In step S514, the system control unit 50 sets (fixes) the moving image material to which SET has been applied in step S504 as the rearrangement moving image material, and displays a fixed frame such as a fixed frame 1101 illustrated in FIG. 11A around the corresponding thumbnail in the rearrangement area 702. In other words, the frame is switched from the frame 901 to the fixed frame 1101. When SET is not applied to the moving image material as the rearrangement moving image material (the moving image material is selected as a candidate for the moving image material to be rearranged or unspecified), the frame is displayed as the frame 901 illustrated in FIGS. 9A to 9C. When SET is applied to the moving image material as the rearrangement moving image material, the frame is displayed as a frame including arrows that enable a leftward/rightward movement, like the fixed frame 1101 illustrated in FIGS. 11A to 11E. In this manner, according to the present exemplary embodiment, the display manner of the frame surrounding the thumbnail located at the central position in the rearrangement area 702 is changed according to the processing to be performed, thereby enabling the user to easily recognize which processing is performed, the rearrangement or the display switching, according to the scroll instruction.

In step S515, the system control unit 50 determines whether the horizontal scroll instruction (the operation for changing the number in the order in the item row) for the rearrangement area 702 is issued. Since the rearrangement moving image material is in the SET state when the processing proceeds to step S515, the scroll instruction can be issued with the drag operation by the horizontal Touch-Move in the rearrangement area 702, the pressing of the left/right key 73*a* or 73*b*, or the operation of rotating the dial 77. However, the scroll instruction cannot be issued with the flick operation on the rearrangement area 702. Since the scroll instruction in step S515 is the scroll instruction for changing the number of the moving image material in the order in the combined moving image, it is desirable to ensure that the scroll instruction can be stopped exactly at a position intended by the user. However, accepting the flick operation can result in overshoot of the scroll instruction beyond the desired position against the user's intention, as the flick operation is such an operation that the thumbnail is moved by the distance according to the operation speed that can be greater than the Touch-Move amount defined by performing the operation once. Therefore, prohibiting the acceptance of the flick operation when the moving image material is arranged enables the user to easily perform a further reliable rearrangement operation. If the system control unit 50 determines that the scroll instruction is issued (YES in step S515), the processing proceeds to step S516. If not (NO in step S515), the processing proceeds to step S518.

In step S516, the system control unit 50 fixes the thumbnail corresponding to the moving image material to which SET has been applied as the rearrangement moving image material in step S504 at the central position of the rearrangement area 702. In other words, the system control unit 50 presents the display in such a manner that the rearrangement moving image material is not moved even when the scroll instruction is issued, and the positions of the moving image materials that are not the rearrangement moving image material are changed. The scroll instruction is an instruction for changing the position of the rearrangement moving image material in the order in the item row, but the displayed position of the rearrangement moving image material to be repositioned is fixed. In other words, the moving image materials other than the rearrangement moving image material are moved in such a manner that the scroll instruction changes the position where the rearrangement moving image material will be inserted (the playback order) (between before and after the change in the order). A central coordinate among X coordinates of the thumbnail corresponding to the rearrangement moving image material is assumed to be Xp.

In step S517, the system control unit 50 displays a rearrangement animation according to the scroll instruction in step S515 with respect to the moving image materials other than the moving image material to which SET has been applied. The rearrangement animation will be described below with reference to FIGS. 6A and 6B.

In step S518, the system control unit 50 determines whether an operation for determining the insertion position of the rearrangement moving image material to which SET has been applied is performed with the touch operation on an item 1003 illustrated in FIGS. 10A to 10C or the pressing of the SET button 74. If the system control unit 50 determines that the operation for determining the insertion position is performed (YES in step S518), the processing proceeds to step S519. If not (NO in step S518), the processing proceeds to step S521.

In step S519, the system control unit 50 determines to set the insertion position of the rearrangement moving image material to which SET has been applied in step S504 to the position where the corresponding thumbnail has been displayed when the operation for determining the insertion position has been performed in step S518. The system control unit 50 changes the frame from the fixed frame 1101 to the frame 901. In FIG. 11A, the thumbnail 6 is located between the thumbnail 3 and the thumbnail 7 when the operation for determining the insertion position is performed, whereby the moving image material 6 is played back between the moving image material 3 and the moving image material 7. In other words, the generated combined moving image is played back in an order of the moving image material 3, the moving image material 6, the moving image material 7, and the moving image material 8. In this manner, the user can change the insertion position of the moving image material to which SET is applied, by applying "SET" to the moving image material to rearrange, and issuing the scroll instruction and performing the determination operation.

In step S520, the system control unit 50 rewrites the ID of the rearrangement moving image material in the management file at the insertion position when the operation for determining the insertion position has been performed in step S518. FIG. 14E illustrates the state of the management file at the time of FIG. 11A, and FIG. 14F illustrates the state of the management file at the time of FIG. 11E. In FIG. 14E, the IDs of the moving image materials are recorded in the management file in an order of the moving image material 5, the moving image material 3, the moving image material 6, the moving image material 7, the moving image material 8, and the moving image material 10. If the rearrangement operation is performed and the operation for determining the arrangement order is performed, in such a manner that for example, if the number of the moving image material 6 in the order is changed, the moving image materials are recorded in the management file in an order of the moving image material 5, the moving image material 3, the moving image material 7, the moving image material 6, the moving image material 8, and the moving image material 10, as illustrated in FIG. 14F. In this manner, when the determination operation is performed, the IDs of the moving image materials are recorded in the management file in the order among the rearranged moving image materials.

In step S521, the system control unit 50 determines whether the operation for unspecifying the specified moving image material is performed. The operation for unspecifying the specified moving image material is any operation among the touch operation on an item 1001 indicating the unspecifying illustrated in FIGS. 10A to 10C, the upward flick operation on the thumbnail located at the center of the rearrangement area 702, or the pressing of the up key 73c of the four-way operational key 73. If the system control unit 50 determines that the operation for unspecifying the specified moving image material is performed (YES in step S521), the processing proceeds to step S510, from which the system control unit performs the processing for returning the specified moving image material from the rearrangement area 702 to the specifying area 701. If not (NO in step S521), the processing returns to step S515.

In this manner, in the rearrangement mode, the user can perform the operation for rearranging the specified moving image material (changing the order of being played back), the operation for switching the displayed thumbnails, and the operation for returning the specified moving image material from the rearrangement area 702 to the specifying area 701 (removing the moving image material from the combined moving image). The thumbnails displayed in the rearrangement area 702 are also switched with the operation for rearranging the moving image material, and the position where the specified moving image material will be inserted can be changed according to the scroll instruction. In this manner, the user can easily rearrange the moving image material in the combined moving image and remove (unspecify) the moving image material from the combined moving image within the same screen, and therefore can generate (edit) the combined moving image with the improved operational usability without switching the screen for removing the moving image material and the screen for rearranging the moving image material. For example, if applying SET to the rearrangement moving image material with an intension to change the insertion position but finding out that this moving image material is unnecessary as a result of the search for the insertion position, the user can immediately unspecify the moving image material.

Fixing the rearrangement moving image material during the rearrangement operation can further improve the operational usability for the rearrangement. If there is only a limited display area available, like the digital camera 100, and the position of the moving image material to be rearranged is moved with the scroll operation or the like with the positions of the other moving image materials kept fixed, the insertion position can be limited to within the moving image materials displayed in the display area. However, presenting the display so as to move the insertion position while fixing the rearrangement moving image material in this manner enables the user to perform the rearrangement operation without the insertion position limited to the currently displayed range even when the rearrangement area 702 is not large enough to fully display the thumbnails contained in the combined moving image.

Fixing the rearrangement moving image material leads to a change in the insertion position according to the operation, together with a display of the rearrangement moving image material sandwiched between the thumbnails of the moving image materials respectively previous and subsequent to the position where the rearrangement moving image material will be inserted during the rearrangement operation. Therefore, the user can easily recognize the moving image material with respect to which the user intends to change the insertion position (the moving image material surrounded by the fixed frame 1101 at the central position of the rearrangement area 702), and therefore can insert the moving image material at the position further accurately matching his/her own intension.

Next, the rearrangement animation according to the present exemplary embodiment will be described with reference to FIGS. 6A and 6B. The program recorded in the nonvolatile memory 56 is loaded to the system memory 52 and is executed by the system control unit 50, by which this processing is realized. This processing is detailed processing of step S517 illustrated in FIG. 5B, and is started when the processing proceeds to step S517.

Figure 5B:
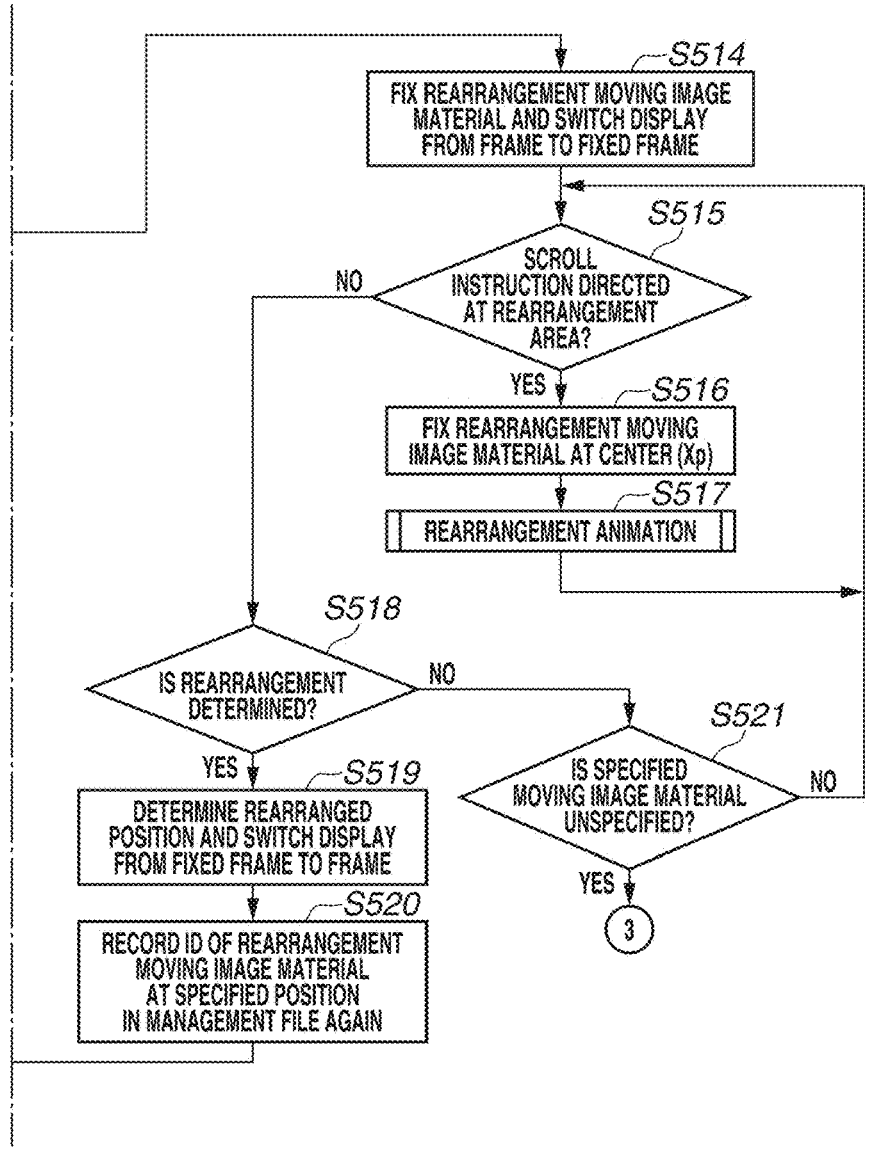

In step S601, the system control unit 50 determines whether the scroll instruction determined in step S515 illustrated in FIG. 5B has been issued with the touch operation. If the system control unit 50 determines that this scroll instruction has been issued with the touch operation (YES in step S601), the processing proceeds to step S602. If not (if the scroll instruction has been issued with the operation on the four-way operational key 73) (NO in step S601), the processing proceeds to step S604.

In step S602, the system control unit 50 detects the movement speed of the touch of the scroll instruction determined in step S515 illustrated in FIG. 5B, and records the detected movement speed into the system memory 52 as A (m/s).

In step S603, the system control unit 50 calculates a movement distance d of the thumbnail for each predetermined time period (within the predetermined time period) from a product ($=A\times\alpha$) of the movement speed of the touch detected in step S602 and a predetermined time period $\alpha$ (s) prepared for updating the display, which will be described below, and records the calculated movement distance d into the system memory 52. Examples of the predetermined time period α include ¹⁄₁₀₀ seconds and ²⁄₁₀₀ seconds.

In step S604, the system control unit 50 records the movement distance d of the thumbnail for each predetermined time period into the system memory 52 as D. The length of D is, for example, 4 L/100, or 4 L/200, assuming that 4 L represents the width of the thumbnail. In other words, if being moved according to the operation on the four-way operational key 73, the thumbnail is moved by a length according to the number of times that the operation has been performed.

In step S605, the system control unit 50 sets an update time period T=0, and records the set update time period T into the system memory 52. The update time period T is a time period for determining whether a time period elapsed so far exceeds the predetermined time period α from a display update, i.e., the issue of the scroll instruction to a next display update. When the update time period T exceeds the predetermined time period α, the display is updated.

Figure 11B:
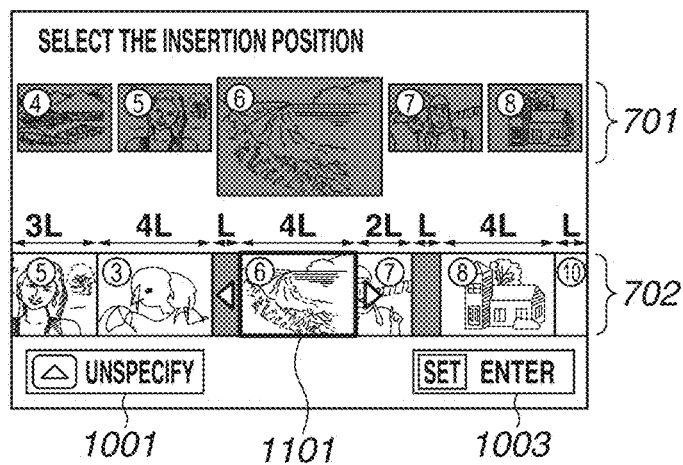

In step S606, the system control unit 50 acquires the X coordinates of the displayed thumbnails. FIGS. 11A to 11E illustrate how the rearrangement animation is displayed, and are an example when the thumbnail 6 is set as the rearrangement moving image material, and the position where the rearrangement moving image material will be inserted is changed to a position immediately subsequent to the original position. In FIG. 11A, the thumbnails are arranged in an order of the thumbnails 5, 3, 6, 7, and 8, and the thumbnail corresponding to the rearrangement moving image material is the thumbnail 6. The X coordinate of the thumbnail of the rearrangement moving image material has been fixed to X=Xp in step S516 illustrated in FIG. 5B. The system control unit 50 acquires the X coordinates of the thumbnails that are not the rearrangement moving image material (the thumbnails subject to the display update), and sets the respective X coordinates (assume that Xn collectively represents them) in the following manner. The respective X coordinates are set to Xn (in an order of the thumbnails 5, 3, 7, and 8)=(X(p−2)n, X(p−1)n, X(p+1)n, and X(p+2)n). According to the present exemplary embodiment, since the number of thumbnails subject to the display update is four in FIG. 11A, the system control unit 50 acquires the X coordinates of the four thumbnails, but there can also be five thumbnails subject to the display update as illustrated in FIG. 11B.

In step S607, the system control unit 50 starts to measure the update time period T with use of the system timer 53.

In step S608, the system control unit 50 determines whether the update time period T started to be measured in step S607 exceeds the predetermined time period α. If the system control unit 50 determines that the update time period T exceeds the predetermined time period α (YES in step S608), the processing proceeds to step S609. If not (NO in step S608), the system control unit 50 waits until the update time period T exceeds the predetermined time period α.

In step S609, the system control unit 50 determines whether a display area of one thumbnail set as a determination target among the thumbnails subject to the display update overlaps a display area of the thumbnail of the rearrangement moving image material (an area on the item row in FIGS. 11A to 11E). The display area of the thumbnail of the rearrangement moving image material is (Xp−2 L)<x<(Xp+2 L) since the central coordinate among the X coordinates of the display area of the thumbnail representing the rearrangement moving image material is Xp set in step S516 illustrated in FIG. 5B, and the width of the thumbnail in an X direction is 4 L. The display area of the thumbnail subject to the display update is also (Xn−2 L)<x<(Xn+2 L). Therefore, the system control unit 50 determines whether the range of the X coordinates of the display area of the thumbnail subject to the display update overlaps the range of the X coordinates of the display area of the thumbnail representing the rearrangement moving image material. The thumbnail that overlaps the display area of the thumbnail of the rearrangement moving image material is the thumbnail of the moving image material to be reordered in the arrangement order in the moving image material file with the rearrangement operation from the number previous to the rearrangement moving image material to the number subsequent to the rearrangement moving image material in the order, or from the number subsequent to the rearrangement moving image material to the number previous to the rearrangement moving image material in the order. This thumbnail is the thumbnail located in a direction according to the scroll instruction. In other words, the thumbnail that overlaps the display area of the thumbnail of the rearrangement moving image material is the thumbnail located previously to the rearrangement moving image material if the scroll instruction is the rightward scroll instruction, and the thumbnail located subsequently to the rearrangement moving image material if the scroll instruction is the leftward scroll instruction. If the system control unit 50 determines that the present thumbnail overlaps the thumbnail of the rearrangement moving image material (YES in step S609), the processing proceeds to step S610. If not (NO in step S609), the processing proceeds to step S611.

In step S610, the system control unit 50 records the thumbnail determined to overlap the rearrangement moving image material in step S609 into the system memory 52 as a thumbnail P.

In step S611, the system control unit 50 records the thumbnail determined not to overlap the rearrangement moving image material in step S609 into the system memory 52 as a thumbnail Q.

In step S612, the system control unit 50 determines whether the determination in step S609 has been made now with respect to all of the thumbnails subject to the display update. In the case of FIG. 11A, the system control unit 50 determines whether all of the thumbnails 5, 3, 7, and 8 have been classified as the thumbnail P or the thumbnail Q. If the system control unit 50 determines that the determination in step S609 has been made with respect to all of the thumbnails subject to the display update (YES in step S612), the processing proceeds to step S613. If not (NO in step S612), the processing returns to step S609, from which the system control unit 50 makes the determination with respect to another thumbnail subject to the display update. For example, the system control unit 50 makes the determination in the order of the thumbnails 5, 3, 7, and 8. The system control unit 50 can, once any thumbnail is determined to be the thumbnail P, determine that the rest of the thumbnails are the thumbnails Q. None of the thumbnails subject to the display update yet overlaps the rearrangement moving image material in FIG. 11A, but the thumbnail 7 overlaps the rearrangement moving image material in FIG. 11B. Therefore, the thumbnail 7 is determined to be the thumbnail P, and the other thumbnails are determined to be the thumbnails Q.

In step S613, the system control unit 50 determines whether the scroll instruction determined in step S515 illustrated in FIG. 5B has been the rightward scroll instruction as viewed from the user. If the system control unit 50 determines that the scroll instruction has been the rightward scroll instruction (YES in step S613), the processing proceeds to step S614. If not (NO in step S613), the processing proceeds to step S615. The rightward direction is a positive direction of the X coordinate.

In step S614, the system control unit 50 sets the X coordinate of the thumbnail P to Xn=X(n−1)+2d, and the X coordinate of the thumbnail Q to Xn=X(n−1)+d. In other words, the system control unit 50 sets the X coordinates in such a manner that the thumbnail that overlaps the rearrangement moving image material is displayed at a position where the X coordinate advances by 2d, and the thumbnail that does not overlap the rearrangement moving image material is displayed at a position where the X coordinate advances by d.

In step S615, the system control unit 50 sets the X coordinate of the thumbnail P to Xn=X(n−1)−2d, and the X coordinate of the thumbnail Q to Xn=X(n−1)−d. In other words, the system control unit 50 sets the X coordinates in such a manner that the thumbnail that overlaps the rearrangement moving image material is displayed at a position where the X coordinate advances by 2d, and the thumbnail that does not overlap the rearrangement moving image material is displayed at a position where the X coordinate advances by d. The X coordinates set in step S615 are the positions of the X coordinates when the leftward scroll instruction has been issued, whereby the system control unit 50 sets the X coordinates in such a manner that the thumbnails are each displayed at a position where the X coordinate advances by the distance 2d or d in an opposite direction from the direction when the rightward scroll instruction has been issued.

In step S616, the system control unit 50 displays the thumbnails with them moved in such a manner that the central coordinate of each of the thumbnails is positioned at the X coordinate set in step S614 or S615 (the display update). Updating the display so as to change the display position of each of the thumbnails per predetermined time period in this manner makes the thumbnails appear as if each of them is being moved. As a shorter time period is employed as the predetermined time period α per which the display is updated, the thumbnails appear to be moved more smoothly.

Now, how the thumbnails are moved every time ((L/d)×α) has elapsed, i.e., how the thumbnails are laid out every time the display is updated by a distance L will be described. FIG. 11A illustrates how the thumbnails are laid out before the thumbnails are moved. In FIG. 11A, the thumbnails are displayed in the order of the thumbnails 5, 3, 6, 7, and 8, and the moving image materials are played back in this order in the combined moving image. In addition, assume that 4 L represents the width of each of the thumbnails illustrated in FIG. 11A. FIGS. 11A to 11E illustrate how the thumbnails other than the thumbnail 6 are moved from the right to the left by one thumbnail when the leftward scroll instruction is issued, and illustrate a course during which the thumbnails are being moved by the distance 4 L (8 L for the thumbnail 7, which will be described below). FIGS. 11A to 11B, 11B to 11C, 11C to 11D, and 11D to 11E each illustrate how the thumbnails are laid out after being moved by L (2 L for the thumbnail 7, which will be described below). In other words, these drawings each illustrate how the thumbnails are laid out after the time period ((L/d)×α) has elapsed. FIGS. 11A to 11E illustrate arrows and L that indicate the length in the rearrangement area 702, but they are illustrated to indicate the distance and are not actually displayed on the display unit 28.

FIG. 11B illustrates an example of the display when the thumbnails 5, 3, 8, and 10 are moved to the left by the distance L from the state illustrated in FIG. 11A. The thumbnail 10, which used to be arranged at a number subsequent to the thumbnail 8 in the order, is also moved so as to be displayed in the rearrangement area 702, and only a part thereof as wide as the distance L (a left quarter of the thumbnail 10) is displayed. Since the thumbnail 5 is moved by the distance L, only a left quarter of the thumbnail 5 disappears from the display. The thumbnail 3 is moved to the left by the distance L but the thumbnail 6 is fixed and is not moved, which results in creation of an empty area as wide as the distance L corresponding to the movement of the thumbnail 3 between the thumbnail 3 and the thumbnail 6. The thumbnail 7 is the thumbnail that overlaps the display area of the rearrangement moving image material, and therefore is moved to the left at a speed twice as fast as the other thumbnails. More specifically, the thumbnail 7 is moved to the left by 2 L, as a result of which a left half of the thumbnail 7 is hidden behind the thumbnail 6 (the left half of the thumbnail 7 overlaps the thumbnail 6 and therefore becomes invisible), and the remaining right half remains visible. The thumbnail 8 is moved to the left only by the distance L while the thumbnail 7 is moved to the left by 2 L, which results in creation of an empty area as wide as the distance L between the thumbnail 7 and the thumbnail 8.

Figure 11C:
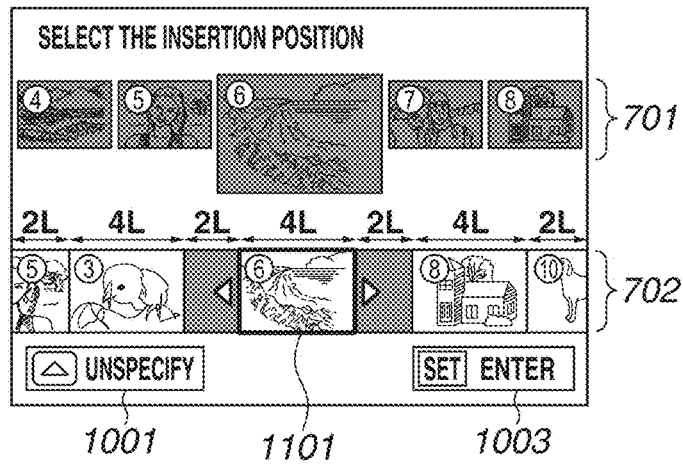

FIG. 11C illustrates an example of the display when the thumbnails 5, 3, 8, and 10 are moved to the left by the distance 2 L from the state illustrated in FIG. 11A. A part of the thumbnail 10 as wide as the distance 2 L (a left half of the thumbnail 10) is displayed. Since the thumbnail 5 is moved by the distance 2 L, only a left half of the thumbnail 5 disappears from the display. The thumbnail 3 is moved to the left by the distance 2 L but the thumbnail 6 is fixed and is not moved, which results in creation of an empty area as wide as the distance 2 L corresponding to the movement of the thumbnail 3 between the thumbnail 3 and the thumbnail 6. The thumbnail 7 is moved to the left by 4 L, as a result of which the thumbnail and the thumbnail 6 overlap each other, making the thumbnail 7 invisible as being hidden behind the thumbnail 6. The thumbnail 8 is moved to the left only by the distance 2 L while the thumbnail 7 is moved to the left by 4 L, which results in creation of an empty area as wide as the distance 2 L between the thumbnail 7 and the thumbnail 8.

Figure 11D:
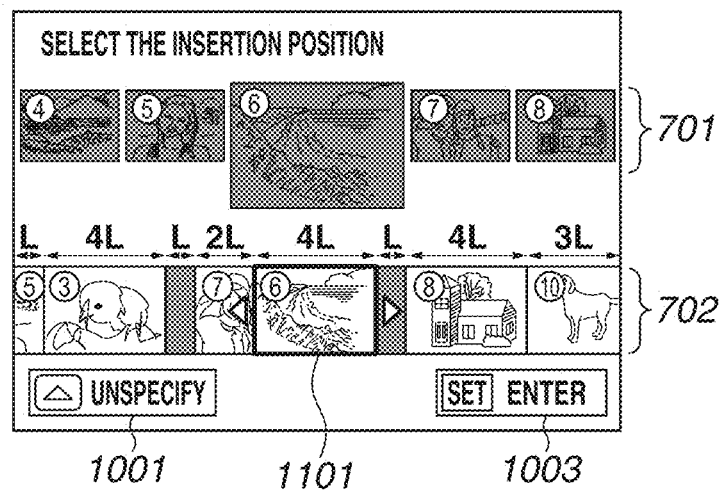

FIG. 11D illustrates an example of the display when the thumbnails 5, 3, 8, and 10 are moved to the left by a distance 3 L from the state illustrated in FIG. 11A. A part of thumbnail 10 as wide as the distance 3 L (a left three-fourths of the thumbnail 10) is displayed. Since the thumbnail 5 is moved by the distance 3 L, only a left three-fourths of the thumbnail 5 disappears from the display and only a right quarter thereof remains displayed. The thumbnail 7 is moved to the left by 6 L and passes through the display area of the thumbnail 6 having the size of the width 4 L, so that a part of the thumbnail 7 as wide as 2 L is displayed from the left side of the thumbnail 6 but the remaining part thereof as wide as 2 L is invisible since overlapping the thumbnail 6. Therefore, since the thumbnail 3 is moved to the left by the distance 3 L and the thumbnail 7 is moved to the left by the distance 2 L from the left side of the thumbnail 6, the distance between the thumbnail 3 and the thumbnail 7 reduces to L. The thumbnail 6 is fixed and is not moved, so that the distance between the thumbnail 8 and the thumbnail 6 that exists in FIG. 11A reduces as much as the movement of the thumbnail 8 to the left by 3 L, leaving an empty area therebetween as wide as the distance L.

Figure 11E:
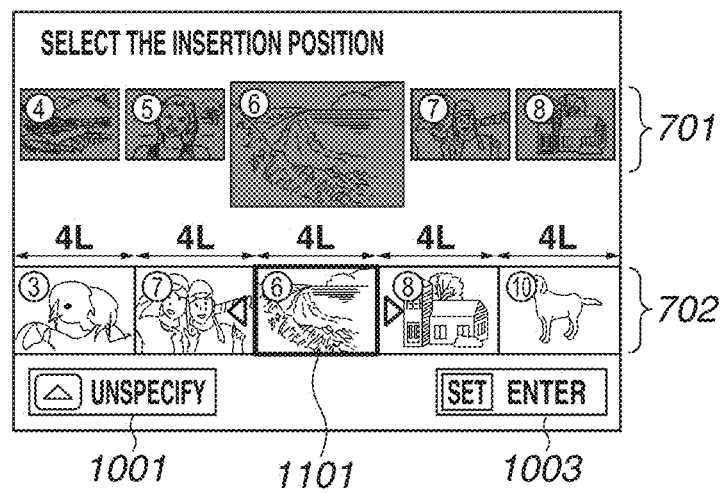

FIG. 11E illustrates an example of the display when the thumbnails 5, 3, 8, and 10 are moved to the left by one thumbnail, i.e., the distance 4 L from the state illustrated in FIG. 11A. The thumbnail 10 is moved by the distance 4 L, and therefore is entirely displayed. The thumbnail 5 is moved by the distance 4 L, and therefore entirely disappears from the display. The thumbnail 7 is moved to the left by 8 L and passes through the display area of the thumbnail 6 having the size of the width 4 L, and therefore is entirely displayed on the left side of the thumbnail 6. This means that the thumbnail 7 is moved across from the right side to the left side of the thumbnail 6 (the number in the playback order is changed from the number subsequent to the thumbnail 6 to the number previous to the thumbnail 6). In other words, this means that the position where the thumbnail 6 will be inserted is changed from between the thumbnail 3 and the thumbnail 7 to between the thumbnail 7 and the thumbnail 8. The thumbnail 8 is moved by 4 L and therefore is displayed next to the fixed thumbnail 6, and the thumbnail 10 is also moved by 4 L and therefore is entirely displayed.

In this manner, when displaying the animation in which the thumbnails are moved with the thumbnail corresponding to the rearrangement moving image material kept fixed, the display is performed in such a manner that the thumbnail passing through (overlapping) the rearrangement moving image material is moved by a longer movement distance than the other thumbnails, which enables the user to easily spot the thumbnail being moved. The position where the rearrangement moving image material will be inserted can be changed by moving the thumbnail to be reordered from the number subsequent to the rearrangement moving image material to the number previous to the rearrangement moving image material in the order, among the thumbnails located previously and subsequently to the rearrangement moving image material, by the distance as long as two thumbnails. In this process, since this thumbnail is moved by two thumbnails, for example, if the thumbnail is suddenly jumped instead of being gradually moved from the right side to the left side of the thumbnail 6, the user can lose track of the thumbnail 7. Then, if the thumbnail is displayed so as to be moved by the same distance as the other thumbnails when being gradually moved, this display also reduces the visibility because leading to an increase in a time period for which the thumbnail is displayed in a manner overlapping the rearrangement moving image material. Therefore, according to the present exemplary embodiment, the display is performed in such a manner that the thumbnail is moved (the display position thereof is changed) at the movement speed twice as fast as the other thumbnails, which enables the user to confirm how the rearrangement progresses with the high visibility maintained, and thereby to easily insert the rearrangement moving image material at the desired position.

In step S617, the system control unit 50 determines whether the scroll instruction determined in step S515 illustrated in FIG. 5B has been issued with the touch operation. If the system control unit 50 determines that the scroll instruction has been issued with the touch operation (YES in step S617), the processing proceeds to step S618. If not (NO in step S617) (the scroll instruction has been issued with the operation on the four-way operational key 73), the processing proceeds to step S620.

In step S618, the system control unit 50 determines whether the touch operation determined to be the scroll instruction in step S515 illustrated in FIG. 5B is released with the Touch-Off. If the system control unit 50 determines that the touch operation is released with the Touch-Off (YES in step S618), the processing proceeds to step S619. If not (NO in step S618), the processing proceeds to step S602.

In step S619, the system control unit 50 determines whether the thumbnails are moved by a distance as long as the number of thumbnail(s) according to the movement distance of the touch operation determined to be the scroll instruction in step S515 illustrated in FIG. 5B. More specifically, if the movement distance as long as the touch operation is not a multiple of 4 L, which is the distance of the width of the thumbnail, the system control unit 50 adjusts the movements in the following manner. If the movement distance is a distance longer than a multiple of 4 L by 2 L or more, the system control unit 50 adjusts the movements in such a manner that the thumbnails are moved by further one thumbnail. If the movement distance is a distance longer than a multiple of 4 L by less than 2 L, the system control unit 50 adjusts the movements in such a manner that the thumbnails are moved by a distance as long as exactly the number of thumbnails equal to the multiple. If the system control unit 50 determines that the thumbnails are moved by a distance as long as the number of thumbnail(s) according to the movement distance of the touch operation (YES in step S619), the system control unit 50 ends the rearrangement animation. If not (NO in step S619), the processing proceeds to step S605.

In step S620, the system control unit 50 determines whether the thumbnails are moved by one thumbnail (4 L), since the thumbnails are moved by the operation on the four-way operational key 73, unlike step S619. If the system control unit 50 determines that the thumbnails are moved by one thumbnail (YES in step S620), the system control unit 50 ends the rearrangement animation. If not (NO in step S620), the processing proceeds to step S605. In this manner, the system control unit 50 continues the animation until the thumbnails are moved by the distance according to the scroll instruction. In FIG. 11A, the thumbnail 3 is the thumbnail arranged at the number immediately previous to the thumbnail 6 in the order, and the thumbnail 7 is the thumbnail arranged at the number immediately subsequent to the thumbnail 6 in the order, but the number of the thumbnail 6 in the order is changed by one thumbnail (to the number immediately subsequent to the original number in the playback order). Therefore, as illustrated in FIG. 11E, the thumbnail 7 becomes the thumbnail arranged at the number immediately previous to the thumbnail 6 in the order, and the thumbnail 8 becomes the thumbnail arranged at the number immediately subsequent to the thumbnail 6 in the order. The change in the number of the thumbnail 6 in the order results in the thumbnail 3 and the thumbnail 7 arranged at numbers adjacent to each other in the order.

In this manner, the present digital camera 100 fixes the rearrangement moving image material when displaying the animation, which prevents the user from losing track of the rearrangement moving image material due to a shift of the position thereof, thereby enabling the user to further easily confirm the position to insert the rearrangement moving image material. Even when the rearrangement operation is performed with the touch operation, the rearrangement instruction is not issued with the scroll instruction for the rearrangement moving image material but the instruction for the rearrangement operation is issued with the scroll instruction for the other thumbnails or the rearrangement area 702, which prevents the rearrangement moving image material from being hidden by the finger performing the operation. Moving the position of the rearrangement moving image material with the touch operation causes the finger to constantly hide the rearrangement moving image material, resulting in the reduction in the visibility of the moving image material (the image of the thumbnail) being rearranged. However, according to the present exemplary embodiment, the moving image materials other than the rearrangement moving image material are moved, whereby the visibility is improved even during the animation.

Having described the exemplary embodiment of the rearrangement processing, this exemplary embodiment has been described mainly focusing on specifying the image in the specifying area 701, unspecifying the specified image in the specifying area 701, fixing the rearrangement image in the rearrangement area 702, and the rearrangement animation. Now, each of these processing procedures will be summarized.

<Specifying Image in Specifying Area>

According to the above-described exemplary embodiment, when inserting the moving image material to contain in the combined moving image at the position desired by the user in the playback order, the user can insert the moving image material at the desired position with the operation for specifying the moving image material. In other words, when feeling like inserting some moving image material before specifying the moving image material, the user can select the moving image material after first deciding the position to insert the moving image material. Therefore, when performing the operation for searching for the moving image material, the user does not have to remember the position where the user has decided to insert the moving image material. Upon finding the moving image material that the user wants to insert, the user only has to perform the selection operation and does not have to perform the operation for displacing the moving image material to the insertion position.

When the user finds the position where the user wants to insert some moving image material from the thumbnail row displayed in the rearrangement area 702, the thumbnails are moved in the rearrangement area 702 in such a manner that the user can easily spot the position where the moving image material to be selected from now will be inserted. The moving image material that is the candidate for the selection (the thumbnail located at the center of the specifying area 701) is positioned horizontally between the moving image material and the moving image material between which the moving image material will be inserted if being selected in the rearrangement area 702, as illustrated in FIG. 7D. Therefore, the user can perform the selection operation while visualizing in what kind of order the moving image materials will be arranged after the insertion of the moving image that is the candidate for the selection.

The user can specify the moving image material and insert the moving image material at the desired position with fewer operations without switching the screen, such as the operation causing the screen to transit to the screen for rearranging the specified (selected) moving image material and performing the operation for determining the insertion position after specifying the moving image material. In other words, the user can insert the moving image material at the desired position by performing the operation for specifying the moving image material with the insertion position already determined. According to the present exemplary embodiment, in the display area, there are provided the area prepared mainly for specifying the moving image material (the specifying area 701) and the area prepared mainly for rearranging the moving image material in the image file (the rearrangement area 702), which enables the user to perform the operation for specifying the image and the operation for rearranging the image even without performing the operation for switching the screen. The user can also perform the operation for specifying the image while confirming the images in the rearrangement area 702, and perform the operation for rearranging the image while viewing the images in the specifying area 701. Even when the display unit 28 has a display area of a limited size and is not large enough to fully display the moving image materials to be contained in the combined moving image, like the digital camera 100, the user can change the position where the moving image material to be specified will be inserted with the scroll instruction for the rearrangement area 702. Similarly, even when there is only a limited display area available, like the digital camera 100, the user can switch the moving image materials displayed in the specifying area 701 with the scroll instruction for the specifying area 701. Therefore, even when the display area is not large enough to fully display the thumbnails as many as all of the moving image materials on one screen, the user can specify the desired moving image material without switching the screen.

<Unspecifying Specified Image in Specifying Area>

According to the above-described exemplary embodiment, the user can unspecify the moving image material in the specifying area 701 even without performing the operation for unspecifying the moving image material in the rearrangement area 702 in the middle of performing the operation for specifying the image (the moving image material). Therefore, the user can perform the operation for unspecifying the moving image material with a smaller number of operations, because being able to perform the operation for unspecifying the moving image material in the area where the user is currently operating even without interrupting the operation for specifying the moving image material, searching for the moving image material from the rearrangement area 702, and performing the operation for unspecifying the moving image material, to unspecify the moving image material. After removing the moving image material, the user can also immediately resume the operation for specifying the moving image material, and therefore can smoothly perform the operation for specifying the moving image material and the operation for removing the moving image material. Since being able to specify and unspecify the moving image material in the moving image specifying mode (in the specifying area 701), the user can further easily search for the moving image material while viewing the thumbnails chronologically arranged in the specifying area 701.

<Fixing Rearrangement Image in Rearrangement Area>

According to the above-described exemplary embodiment, fixing the rearrangement moving image material enables the user to rearrange the moving image material with the improved operational usability even within the limited area. The moving image material to be rearranged is displayed at the fixed position, and the displayed moving image materials are moved so as to sandwich the fixed position therebetween when the rearrangement operation is performed, so that the user can easily understand the arrangement order among the moving image materials. According to the present exemplary embodiment, the display is performed in such a manner that the moving image material to be rearranged is fixed and the other moving image materials are moved, which enables the user to insert the moving image material even at a position other than the displayed positions with the rearrangement operation (the operation for switching the displayed moving image materials) even within the limited area. Even when the rearrangement area 702 is not large enough to fully display the thumbnails of the already-specified moving image materials within the rearrangement area 702 on one screen, the user can change the insertion position with the scroll instruction. The user can perform the operation for rearranging the moving image material and issue the instruction to scroll the thumbnails in the rearrangement area 702 with the same operation, i.e., the operation for switching the displayed thumbnails, and therefore can perform each of the operations with the improved operational usability even when there is only a limited display area available. Fixing the rearrangement moving image material causes the insertion position to be changed according to the operation and the rearrangement moving image material to be displayed in a manner sandwiched between the thumbnails of the moving image materials respectively previous and subsequent to the position where the rearrangement moving image material will be inserted during the rearrangement operation, thereby enabling the user to easily understand the arrangement order in the combined moving image and thus further reliably decide the rearrangement position.

According to the present exemplary embodiment, the rearrangement moving image material is fixed when the animation is displayed, whereby the user is prevented from losing track of the rearrangement moving image material due to a shift of the position thereof. The user therefore can further easily confirm the position to insert the rearrangement moving image material. The instruction for the rearrangement operation is issued with the touch operation on the thumbnails that are not the rearrangement moving image material, or the rearrangement area 702, which prevents the rearrangement moving image material from being hidden by the finger performing the operation, whereby the visibility of the rearrangement moving image material (the image of the thumbnail) is improved even during the animation.

<Rearrangement Animation>

According to the above-described exemplary embodiment, the display is performed in such a manner that the thumbnail that overlaps the rearrangement moving image material is moved by the longer movement distance than the other thumbnails, and therefore can reduce a time period for which the rearrangement moving image material and the thumbnail overlap each other, and an area over which the thumbnails overlap each other. In other words, the item that overlaps the rearrangement moving image material (that will be interchanged with the rearrangement moving image in terms of the arrangement order) appears as if being moved faster than the moving image materials that do not overlap the rearrangement moving image, so that the time period for which the thumbnails overlap each other can be reduced. Therefore, the visibility of the thumbnail being moved is maintained, and the recognition of the thumbnail that is in the middle of being moved is facilitated.

Exemplary modifications of the above-described exemplary embodiment will be described with reference to FIGS. 12A to 12E and 13A to 13C. First, exemplary modifications of the processing for unspecifying the image in the specifying area 701 illustrated in FIG. 4 will be described with reference to FIG. 12A to 12E, and an exemplary modification of the rearrangement animation illustrated in FIGS. 6A and 6B will be described with reference to FIGS. 13A to 13C.

FIGS. 12A to 12E illustrate the exemplary modifications of the processing illustrated in FIG. 4, and illustrate an example of the display manner of the already-specified moving image material in the specifying area 701. In the above-described exemplary embodiment, the thumbnail corresponding to the specified image is displayed in the display manner 709, in which the thumbnail 6 grays out as illustrated in FIG. 7E. Meanwhile, in the exemplary modification, the display is performed in such a manner that a checkmark, a mark, or the like is added without changing the display manner of the thumbnail itself. In the above-described exemplary embodiment, the thumbnail placed in the specifying area 701 can be specified only once per kind of thumbnail. However, in the exemplary modification, the thumbnail can be specified a plurality of times.

Figure 12A:
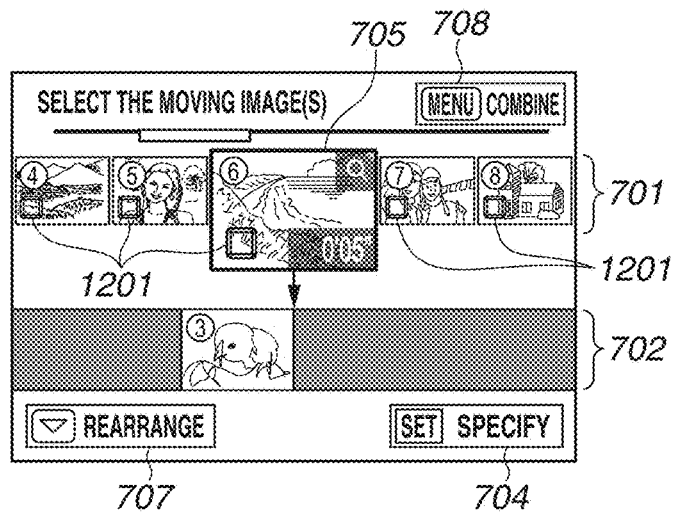
FIGS. 12A to 12E are diagrams illustrating a display manner example of an already-specified moving image material in the specifying area.
Figure 12B:
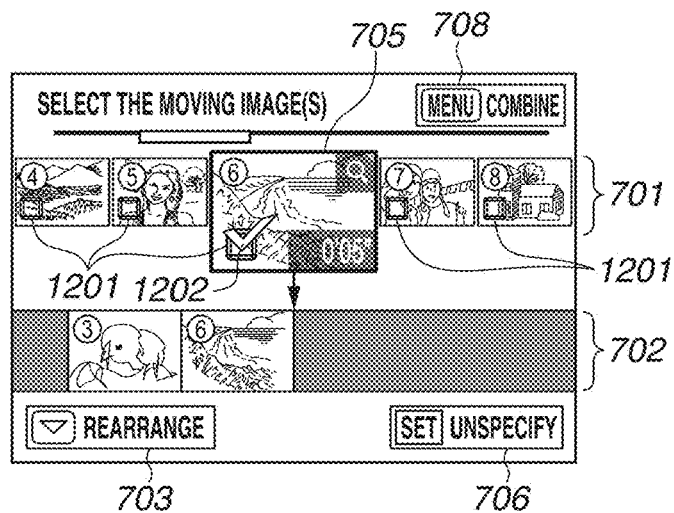
Figure 12C:
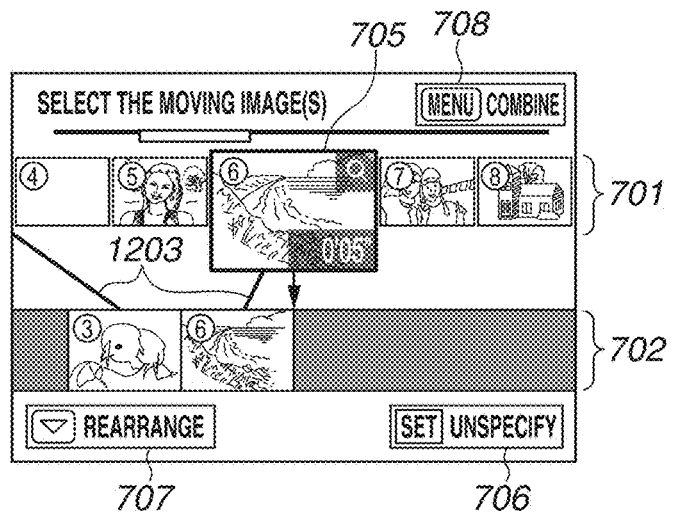

FIGS. 12A to 12C illustrate display examples for indicating the display manner for expressing the specified moving image material. In FIG. 12A, a check box 1201 is displayed in a manner superimposed on each of the thumbnails located in the specifying area 701. When the operation for specifying (applying SET to) the moving image material is performed in step S318 illustrated in FIG. 3B in this case, a check 1202 is displayed in the check box 1201, like the thumbnail 6 illustrated in FIG. 12B. In this manner, the check placed on the thumbnail enables the user to notice that the moving image material corresponding to this thumbnail is already-specified, and no check placed on the thumbnail enables the user to notice that the moving image material corresponding to this thumbnail is non-specified. When the operation for unspecifying the moving image material in step S318 is performed in a state illustrated in FIG. 12B, the check 1202 disappears from the display and the thumbnail 6 disappears from the display in the rearrangement area 702.

In FIG. 12C, the thumbnails 3 and 6 are displayed in the rearrangement area 702, and are already-specified as the moving image materials to be rearranged. The thumbnail 6 in the specifying area 701 and the thumbnail 6 in the rearrangement area 702 are connected to each other via a line 1203, which enables the user to notice that the thumbnail 6 in the specifying area 701 is the already-specified moving image material. The thumbnail 3 is not displayed in the specifying area 701 illustrated in FIG. 12C, but the line 1203 extends from the thumbnail 3 in the rearrangement area 702 in a direction where the thumbnail 3 in the specifying area 701 is located. In this manner, the already-specified moving image material is connected to the corresponding thumbnail located in the rearrangement area 702 via the line 1203, which enables the user to notice that not only this moving image material is already-specified but also around where the thumbnail in the rearrangement area 702 is located in the specifying area 701. In the specifying area 701, the thumbnails are arranged chronologically in the order of when the images have been captured, so that the user can easily confirm, for example, the order in which the images have been captured.

Having described the exemplary modifications of the exemplary embodiment, according to the above-described exemplary modifications, the user can not only recognize whether the moving image material is the already-specified moving image material, but also understand the position in the rearrangement area 702 and the position in specifying area 701 in association with each other. Therefore, when searching for the desired thumbnail by switching the thumbnails displayed in the display area (the scroll instruction) with the display area not large enough to fully display the thumbnails, the user can be aware of in which direction the position of the thumbnail is located.

Figure 12D:
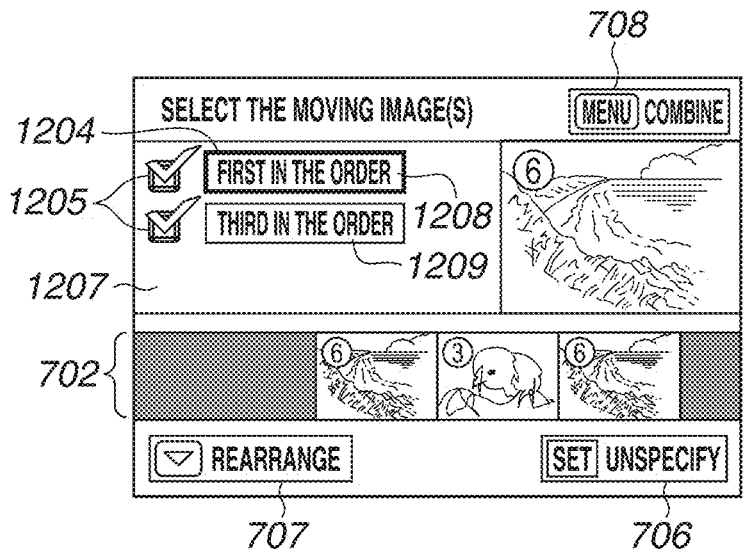
Figure 12E:
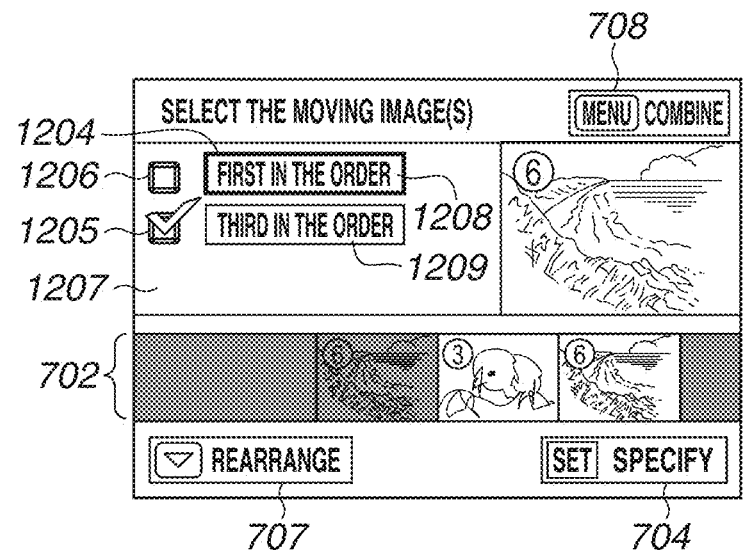

FIGS. 12D and 12E illustrate the example of the display of when one kind of thumbnail is specified a plurality of times. An operation area 1207 contained in the specifying area 701 illustrated in FIG. 12D is displayed when the moving image material selected (located at the central position) in the specifying area 701 is the already selected moving image material. As indicated in the operation area 1207, the moving image material corresponding to the thumbnail 6 is inserted at a first number and a third number in the order in the combined moving image currently set in the rearrangement area 702. In this case, the thumbnail 6 can be further specified as the already-specified moving image material (a third moving image material 6) with the operation of performing the Touch-Move as if downwardly dropping the thumbnail 6 placed in the specifying area 701. An icon 1208 indicating the first number in the order, which is one of the icon 1208 indicating the first number in the order and an icon 1209 indicating the third number in the order, is surrounded by a frame 1204, which indicates that this moving image material is in the selected state. In this state, the moving image material inserted at the first number in the order in the combined moving image can be unspecified by performing any of an operation of touching a check 1205, the operation of touching the item 706, and the operation of pressing the SET button 74 (provided that the icon 1208 is in the selected state). FIG. 12E illustrates an example of the display of the display unit 28 when the moving image material corresponding to the thumbnail 6 is unspecified from the first number in the order in the combined moving image that is in the middle of being generated. A check box 1206 is displayed. The display of the check box 1206 without the check 1205 displayed therein indicates that this moving image material is non-specified. The check 1205 is not displayed at the icon 1208 indicating the first number in the order but is displayed at the icon 1209 indicating the third number in the order, which enables the user to notice that the moving image material inserted at the first number in the order is unspecified but the moving image material inserted at the third number in the order is in the specified state. The indication of the icon 1209 indicating the third number in the order can be changed to a second number in the order. In the rearrangement area 702, the thumbnail 6 that used to be arranged at the first number in the order is grayed out. However, this thumbnail 6 can be specified again by performing once more any of an operation of touching the check box 1206 of the icon 1208 indicating the first number in the order illustrated in FIG. 12E, the operation of touching the item 704, and the operation of pressing the SET button 74 (provided that the icon 1208 is in the selected state). In other words, the moving image material corresponding to the thumbnail 6 can be inserted at the first number in the order again.

Having described the exemplary modification of the exemplary embodiment, according to the above-described exemplary modification, when inserting one kind of moving image material at a plurality of positions in the combined moving image, the user can easily perform the operation for unspecifying the specified moving image material at some position among them. The user can confirm at which positions the selected moving image material is arranged in the combined moving image and thus can spot the positions of the moving image material even when the moving image material is inserted at the plurality of positions in the combined moving image, and therefore can easily search for the moving image material.

In the above description, the rearrangement moving image material is fixed at the center of the rearrangement area 702 when the moving image material is rearranged, but is not limited thereto and the rearrangement moving image material can be fixed at a position according to the scroll direction. More specifically, the rearrangement moving image material can be fixed at a position close to a right end of the display unit 28 when the rightward scroll instruction is issued, and the rearrangement moving image material can be fixed at a position close to a left end of the display unit 28 when the leftward scroll instruction is issued. Fixing the rearrangement moving image material at the position according to the scroll direction in this manner enables the user to confirm more thumbnails newly displayed in the rearrangement area 702 due to the scroll instruction. More specifically, in the case where the rearrangement moving image material is displayed at the center, the thumbnails are displayed in the equally sized areas on the left side and the right side of the rearrangement moving image material. However, fixing the rearrangement moving image material at the position close to the end in the scroll direction enables the user to confirm more thumbnails that will be interchanged with the rearrangement moving image material in terms of the order from now than thumbnails that have been already interchanged with the rearrangement moving image material in terms of the order. Therefore, when wanting to insert the rearrangement moving image material at a further previous or subsequent position while viewing the thumbnails of the moving image materials that will be interchanged with the rearrangement moving image material in terms of the order from now, the user does not have to issue the scroll instruction carefully so as not to overshoot the desired position. The user can confirm the desired position ahead of time, and therefore can decide the insertion position further reliably and quickly. It is desirable that the position where the rearrangement moving image material is fixed is a position that is located close to the end in the scroll direction but is not an endmost position among the displayed thumbnails, because this positioning enables the user to confirm the moving image material previous to and subsequent to the rearrangement moving image material.

Figure 13A:
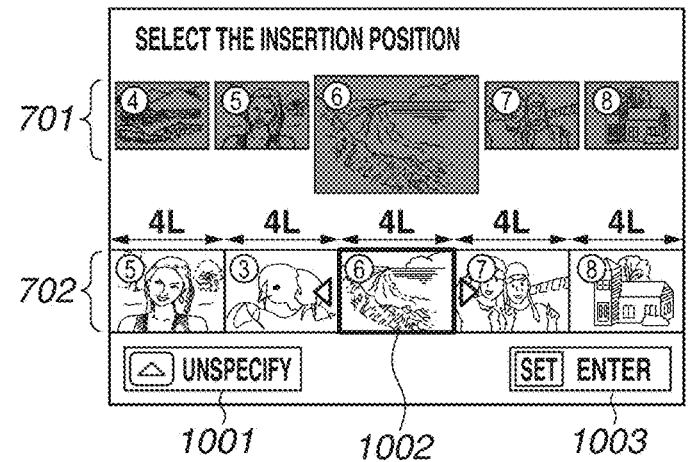
FIGS. 13A to 13C are diagrams illustrating how the rearrangement animation is displayed.
Figure 13B:
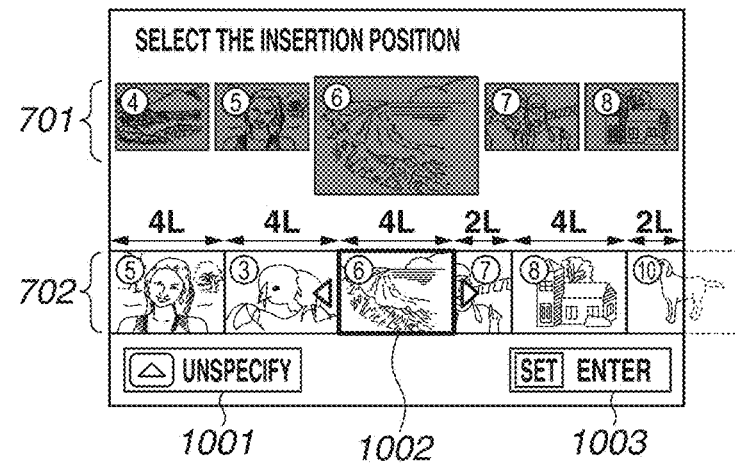
Figure 13C:
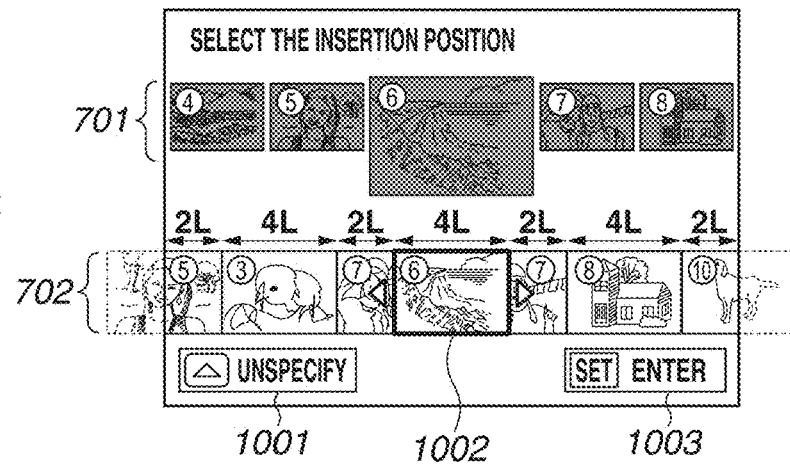

Next, the exemplary modification of the rearrangement animation illustrated in FIGS. 6A and 6B will be described with reference to FIGS. 13A to 13C. FIG. 13A illustrates an example of the display of the display unit 28 before the rearrangement animation is started similarly to FIG. 11A, and FIGS. 13B and 13C illustrate an example of the display in the middle of the rearrangement animation. FIGS. 13B and 13C illustrate an example of the display when the thumbnail 6 is set as the rearrangement moving image material, and the thumbnails are moved halfway through in the course in which the thumbnails of the moving image materials other than the rearrangement moving image material are moved to the left by one thumbnail.

In FIG. 13B, the thumbnail 7 is displayed with the width thereof in the X direction reduced (compressed) by half from the width of 4 L to the width of 2 L. The left half (2 L) of the thumbnail 10 is displayed without the size thereof reduced. The thumbnails 5 and 3 are not moved from their respective positions illustrated in FIG. 13A, and the thumbnail 8 is moved to the left by 2 L from its position illustrated in FIG. 13A. In other words, the issue of the scroll instruction for the rearrangement causes a gradual reduction in the width of the moving image material to be reordered from/to the number previous to the rearrangement moving image material to/from the number subsequent to the rearrangement moving image material in the order between before and after the rearrangement, which enables the rearrangement animation to be displayed while maintaining an adjacent state between the thumbnails. The thumbnail 10 is gradually appearing in the display of the rearrangement area 702 in the course of the gradual reduction in the width of the thumbnail 7. After FIG. 13B, the thumbnail 7 is being squashed on the right side of the thumbnail 6 and is being disappearing on the right side of the thumbnail 6, and is being gradually extending from the left side of the thumbnail 6 until regaining the width as wide as normal one thumbnail from the state reduced in width in the X direction (0 to 4 L). The thumbnail 5 is disappearing from the display in the rearrangement area 702 in the course of the gradual increase in the width of the thumbnail 7.

Having described the exemplary modification of the exemplary embodiment, according to the above-described exemplary modification, in the rearrangement animation indicating how the moving image material is interchanged with the rearrangement moving image material in terms of the order in the combined moving image, the adjacent state between the thumbnails can be maintained by expressing this interchange by the extension and the compression of the thumbnail. Therefore, the user can easily confirm the current number of the moving image material in the order. The display manner of the thumbnail 7 is changed by being extended and compressed, so that the user can immediately recognize that the thumbnail 7 is the thumbnail to be interchanged with the rearrangement moving image material in terms of the order.

In FIG. 13C, the left half area of the thumbnail 7 as wide as 2 L and the remaining right half area of the thumbnail 7 as wide as 2 L, in the width 4 L of the thumbnail 7, are displayed on the left side and the right side of the thumbnail 6, respectively. In this state, the thumbnails 5, 3, 8, and 10 are moved to the left by 2 L for each of them. A part of the thumbnail 7 is being gradually moved, starting from the left side of the thumbnail 7, from the right side to the left side of the thumbnail 6 of the rearrangement moving image material, as the animation progresses.

Having described the exemplary modification of the exemplary embodiment, according to the above-described exemplary modification, in the rearrangement animation indicating how the moving image material is interchanged with the rearrangement moving image material in terms of the order in the combined moving image, the adjacent state between the thumbnails can be maintained by expressing this interchange while moving a part of the thumbnail. Therefore, the user can easily confirm the current number of the moving image material in the order. Although the thumbnail 7 is displayed with the area thereof divided, a whole portion of the thumbnail 7 is constantly visibly displayed, which prevents the reduction in the visibility, whereby the recognition of the content of the thumbnail being interchanged with the rearrangement moving image material is facilitated in terms of the order.

In the above-described exemplary embodiment, the display is performed in such a manner that the thumbnail passing through the fixed thumbnail is moved by the movement distance twice as long as the movement distance of the other thumbnails since the fixed thumbnail and the thumbnail to be moved are the same in width, but is not limited thereto. In another exemplary embodiment, the width of the fixed thumbnail is 8 L compared to the thumbnail to be moved, thus, moving the thumbnail by a triple movement distance can improve the visibility of the rearrangement animation.

The thumbnail that overlaps the thumbnail of the rearrangement moving image material has been described as becoming partially invisible at the portion thereof that overlaps the rearrangement moving image material while being moved. However, the thumbnail does not necessarily have to completely overlap the thumbnail of the rearrangement moving image material, and can be partially visible by changing transparency of the display.

In the present exemplary embodiment, the specified moving image materials as a single combined moving image is recorded. Alternately, only the management file in which the IDs of the moving image materials can be recorded. More specifically, the digital camera 100 can be configured to read out the IDs of the moving image materials that are recorded in the recorded management file, and play back the moving images in the recorded order among the moving image materials, at the time of the playback.

In the above-described exemplary embodiment, even after the operation for specifying the moving image material is performed in the specifying area 701 or the operation for unspecifying the moving image material is performed in the rearrangement area 702, the operated thumbnail is displayed at the center while the operated thumbnail is kept in the selected state. However, the displayed thumbnails can be moved by one thumbnail in such a manner that the selected thumbnail shifts to a next thumbnail (adjacent on the right) after the operation for specifying or unspecifying the moving image material is performed. More specifically, the display is performed in such a manner that, after the operation for specifying the moving image material is performed with the thumbnail 6 selected in FIG. 7C, the thumbnails 4 to 8 in the specifying area 701 are moved to the left by one thumbnail, and the thumbnail 7 is to be in the selected state. The movements of the thumbnails in this manner enable the user to continuously perform the operation for specifying the moving image material or the operation for unspecifying the moving image material.

In the present exemplary embodiment, the selected moving image material is played back when playing back of the moving image material is performed, but is not limited thereto, and can be configured to play back the moving image materials, including the moving image materials respectively previous and subsequent to the selected moving image material. In the present exemplary embodiment, the combined moving image is generated from the plurality of moving image materials by way of example, but aspects of the present invention can also be applied to generation of a slide show from still images. A still image can be contained in the combined moving image, and the file to be generated does not have to be the combined moving image and can be a layout of images for printing, generation of a music file, etc. Aspects of the present invention are also effective when the specifying operation and the rearrangement operation are targeted at not only the thumbnail or the image, but also an icon, an item, a display material, etc.

A single hardware device can control the electronic apparatus, or a plurality of hardware devices can control the entire apparatus by dividing the processing among them.

While aspects of the present invention have been described in detail based on the representative exemplary embodiments thereof, the aspects of the present invention are not limited to these specific exemplary embodiments, and also cover various embodiments within a range that does not depart from the spirit of the aspects of the present invention. Each of the above-described exemplary embodiments merely indicates one exemplary embodiment of the present invention, and the individual exemplary embodiments can also be arbitrarily combined.

Aspects of the present invention can also be realized by performing the following processing. That is, the aspects of the present invention can also be realized by processing that supplies software (a program) that realizes the functions of the above-described exemplary embodiments to a system or an apparatus via a network or various kinds of recording media, and causes a computer (or a central processing unit (CPU), a micro processing unit (MPU), or the like) of this system or apparatus to read out and execute the program. In this case, this program, and the recording medium storing this program constitute aspects of the present invention.

In the above-described exemplary embodiments, aspects of the present invention have been described referring to the example in which the aspects of the present invention are applied to the digital camera 100, but is not limited to this example and can also be applied to the following apparatuses. The example described with reference to FIGS. 3A and 3B to 5A and 5B can be applied to any apparatuses as long as this apparatus is an image processing apparatus where an image can be selected from a plurality of images. The example described with reference to FIGS. 4 and 5A and 5B can be applied to any apparatus as long as this apparatus is a display processing apparatus where an item can be specified and unspecified. The example described with reference to FIGS. 5A and 5B can be applied to any apparatus as long as this apparatus is an electronic apparatus where an item can be rearranged. The example described with reference to FIGS. 6A and 6B can be applied to any apparatus as long as this apparatus is an electronic apparatus that can control a display position of an item. More specifically, aspects of the present invention can be applied to a personal computer (PC), a mobile telephone terminal and a mobile image viewer, a digital photo frame, a music player, a game machine, an electronic book reader, a tablet PC, a smart-phone, a projector, home electronics including a display unit, and the like. Aspects of the present invention can also be applied to an apparatus, such as a smart-phone, a tablet PC, and a desktop PC, that receives a live view image captured by a digital camera or the like via wired or wireless communication and displays this image, and remotely controls the digital camera (including a network camera).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to aspects of the present invention, an icon and a material can be displayed in an arranged manner with improved operational usability.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. A display processing apparatus comprising:
one or more processors; and
a memory storing instructions that, when executed by the one or more processors, cause the display processing apparatus to function as:
a specifying unit configured to specify an unspecified item from items displayed in a first area,
a display control unit configured to display the specified item distinguishably from an unspecified item in the first area and to display an item corresponding to the specified item in a second area in response to the unspecified item being specified,
an acceptance unit configured to accept a first operation to target the specified item displayed in the first area from among the items displayed in the first area, and
a control unit configured to perform control,
to contain an image corresponding to an item in the first area which is specified by the specifying unit into a series of images which is configured to be sequentially played back, in response to the unspecified item being specified, and to remove an image corresponding to the specified item on which the first operation is performed from the series of images and not to display the item, which relates to the specified item on which the first operation is performed, in the second area in response to the first operation being performed in the first area.

2. The display processing apparatus according to claim 1, wherein the acceptance unit further is configured to accept a second operation that targets an item displayed in the second area, and
wherein, in response to acceptance of the second operation, the control unit performs control in a manner that an image, corresponding to the item displayed in the second area and targeted by the second operation, is removed from the series of images according to the second operation.

3. The display processing apparatus according to claim 1, wherein executing the instructions further cause the display processing apparatus to function as a rearrangement unit configured to rearrange the item displayed in the second area based on a user operation that specifies an order of images.

4. The display processing apparatus according to claim 1, further comprising a touch detector configured to detect a touch operation on a touch panel,
wherein the first operation is the touch operation on the item displayed in the first area.

5. The display processing apparatus according to claim 1, wherein each of the items is an item corresponding to a different image, and
wherein the items displayed in the first area are displayed in a manner arranged in an order based on any order among: an order of names of files of corresponding images, an order of dates and/or times when the images are captured, or an order of dates and/or times when the files of images are generated.

6. The display processing apparatus according to claim 1, wherein the first area and the second area respectively contain items arranged in a line, and the lines of items arranged in the first area and the second area are parallel to each other.

7. The display processing apparatus according to claim 1, wherein executing the instructions further causes the display processing apparatus to function as an image processing unit configured to create a moving image file including a plurality of moving images corresponding to the items displayed in the second area.

8. The display processing apparatus according to claim 7, wherein the image processing unit creates a moving image file configured in such a manner that corresponding moving images are played back in an order based on an order of items arranged in the second area.

9. The display processing apparatus according to claim 1, wherein the first operation is an operation to an item displayed at a predetermined position among the items displayed in the first area.

10. The display processing apparatus according to claim 9, wherein the predetermined position is a central position of the first area.

11. The display processing apparatus according to claim 1, wherein the distinguishable display is a gray-out or a checkmark.

12. The display processing apparatus according to claim 1, wherein the image removed from the second area corresponds to the previously specified item displayed in the first area and targeted by the first operation.

13. The display processing apparatus according to claim 1, the image removed from the second area is a specified image material in the second area that is returned into the first area with the first operation for the first area.

14. The display processing apparatus according to claim 1, wherein the first area is a specifying area and the second area is a rearrangement area, the previously specified item is located in the rearrangement area, and the first operation is an operation for unspecifying an image in the second area performed when a thumbnail in the specifying area in a specified state is selected such that the previously specified item is gradually moved from the rearrangement area so as to be displaced to the thumbnail displayed in the specifying area.

15. A method for controlling a display processing apparatus, the method comprising:

specifying an unspecified item from items displayed in a first area;

displaying the specified item distinguishably from an unspecified item in the first area and to display an item corresponding to the specified item in a second area in response to the unspecified item being specified;

accepting a first operation to target the specified item displayed in the first area from among the items displayed in the first area; and performing control, to contain an image corresponding to an item in the first area which is specified by the specifying into a series of images which is configured to be sequentially played back, in response to the unspecified item being specified, and to remove an image corresponding to the specified item on which the first operation is performed from the series of images and not to display the item, which relates to the specified item on which the first operation is performed, in the second area in response to the first operation being performed in the first area.

16. A non-transitory computer-readable storage medium storing computer executable instructions to cause a computer to perform a method for controlling a display processing apparatus, the method comprising:

specifying an unspecified item from items displayed in a first area;

displaying the specified item distinguishably from an unspecified item in the first area and to display an item corresponding to the specified item in a second area in response to the unspecified item being specified;

accepting a first operation to target the specified item displayed in the first area from among the items displayed in the first area; and performing control, to contain an image corresponding to an item in the first area which is specified by the specifying into a series of images which is configured to be sequentially played back, in response to the unspecified item being specified, and to remove an image corresponding to the specified item on which the first operation is performed from the series of images and not to display the item, which relates to the specified item on which the first operation is performed, in the second area in response to the first operation being performed in the first area.

* * * * *